United States Patent [19]
Miyasaka et al.

[11] Patent Number: 6,105,242
[45] Date of Patent: Aug. 22, 2000

[54] PALLET ROUTING SYSTEM FOR A VERSATILE PRODUCTION SYSTEM

[75] Inventors: Kazumi Miyasaka; Eiichi Terabayashi; Katsunao Sasaki, all of Kahoku-gun; Hiroyoshi Terashima, Kanazawa, all of Japan

[73] Assignee: Fujitsu Limited, Kawasaki, Japan

[21] Appl. No.: 08/263,735

[22] Filed: Jun. 22, 1994

Related U.S. Application Data

[62] Division of application No. 08/026,064, Mar. 4, 1993, Pat. No. 5,355,579.

[30] Foreign Application Priority Data

| Oct. 29, 1992 | [JP] | Japan | 4-291168 |
| Oct. 29, 1992 | [JP] | Japan | 4-291213 |
| Oct. 30, 1992 | [JP] | Japan | 4-292927 |
| Nov. 6, 1992 | [JP] | Japan | 4-297375 |
| Nov. 6, 1992 | [JP] | Japan | 4-297376 |

[51] Int. Cl.[7] .......................... B23P 21/00; B65G 43/08; B65G 65/06
[52] U.S. Cl. ................ 29/784; 29/786; 29/793; 198/464.2; 198/465.2
[58] Field of Search .................. 29/33 P, 563, 29/772, 784, 786, 793, 794, 430; 198/346.1, 346.2, 465.2, 464.2; 414/222, 788.7, 798.2, 798.9

[56] References Cited

U.S. PATENT DOCUMENTS

| 2,896,314 | 7/1959 | Godwin et al. ........................ 29/784 X |
| 3,854,889 | 12/1974 | Lemelson ............................. 29/563 X |
| 4,306,355 | 12/1981 | Hawrlyo et al. ...................... 29/730 X |

(List continued on next page.)

FOREIGN PATENT DOCUMENTS

| 0201262 | 11/1986 | European Pat. Off. . |
| 0351431 | 1/1990 | European Pat. Off. . |
| 0472155 | 2/1992 | European Pat. Off. . |
| 2506197 | 11/1982 | France . |
| 2592864 | 7/1987 | France . |

(List continued on next page.)

OTHER PUBLICATIONS

M. Sheifele, *Simulation Eines Flexiblen Montagesystems*, Werkstattstechnik, Zeitschrift fur Industrielle Fertigung, vol. 74, No. 6, Jun. 1984, pp. 337–340.

Japanese Patent Abstract, vol. 8, No. 191, Sep. 1984 & JP–A–59 082 230.

R. Vetter, *Materialflussgerechtes Gestalten von Montagesystemen fuer die Serienfertigung von Electroerzeugnissen*, Werkstatt und Betrieb, vol. 119, No. 1, Jan. 1986, pp. 25–31.

(List continued on next page.)

*Primary Examiner*—Peter Vo
*Attorney, Agent, or Firm*—Staas & Halsey

[57] ABSTRACT

A versatile production system produces different kinds of products in small quantities. The system includes production lines for assembling parts into different kinds of products, testing the assembled products, and conveying the products that have passed the tests to a collective packing terminal. Each production line has a pallet feeder for feeding pallets one by one to the start of the production line. Each production line has a bypass structure. The bypass structure includes a first switcher, a main line, a bypass line, and a second switcher. The first switcher determines whether or not a product conveyed on a pallet must be repaired or tested, and according to the determination, switches the pallet and product from the production line to one of the main and bypass lines. The main line receives pallets and products switched thereto by the first switcher and conveys same. The bypass line receives pallets and products switched thereto by the first switcher and conveys them slower than the main line, or temporarily stops them. The second switcher switches pallets and products from the main and bypass lines to the production line. The collective packing system packs products conveyed on pallets and returns the emptied pallets to the respective production lines.

6 Claims, 26 Drawing Sheets

U.S. PATENT DOCUMENTS

| | | | |
|---|---|---|---|
| 4,309,600 | 1/1982 | Perry et al. | 29/33 P X |
| 4,703,558 | 11/1987 | Makinen | 29/784 |
| 4,930,258 | 6/1990 | Carlson | 198/465.2 X |
| 5,078,254 | 1/1992 | Colonius et al. | 198/465.2 X |
| 5,271,139 | 12/1993 | Sticht | 29/430 |

FOREIGN PATENT DOCUMENTS

| | | | |
|---|---|---|---|
| 3217491 | 1/1983 | Germany . | |
| 3532508 | 3/1987 | Germany . | |
| 295135 | 12/1988 | Japan | 29/784 |
| 146034 | 5/1992 | Japan | 29/794 |
| 23954 | 2/1993 | Japan | 29/794 |
| 77116 | 3/1993 | Japan | 29/784 |

OTHER PUBLICATIONS

M. Werz, *Flexibles Modulares Montagesystem*, Werkstatt und Betrieb, vol. 120, No. 6, Jun. 1987, pp. 433–438.

M. Schmidt, *Montageverkettung Mit FTS*, ZWF Zeitschrift fur Wirtschaftliche Fertigung und Automatisierung, vol. 82, No. 9, Sep. 1987, pp. 511–514.

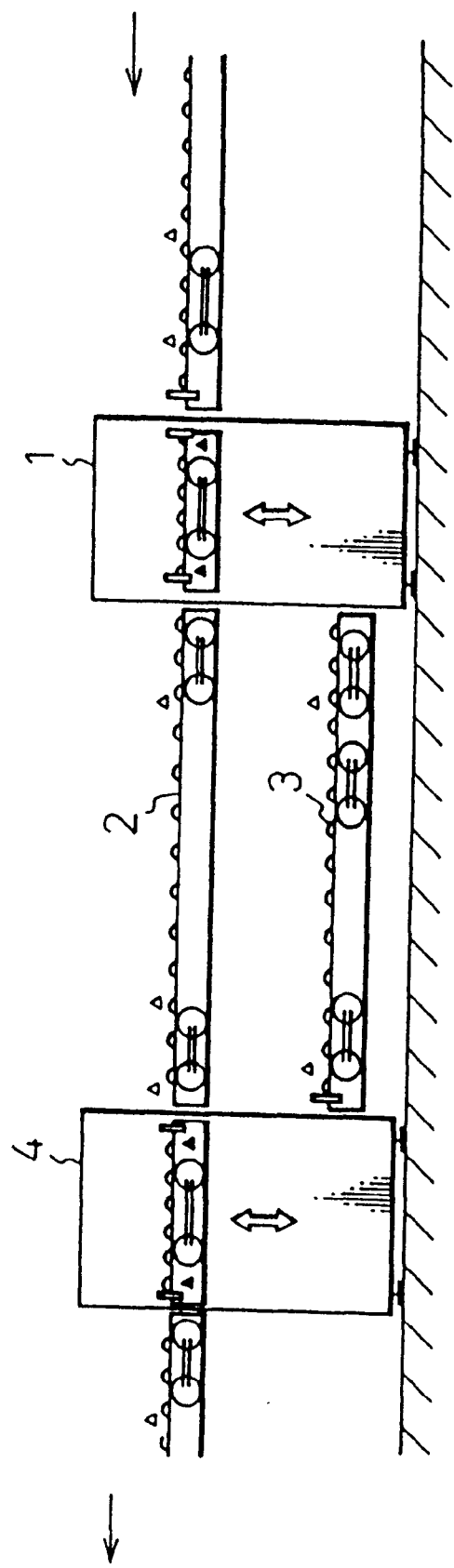

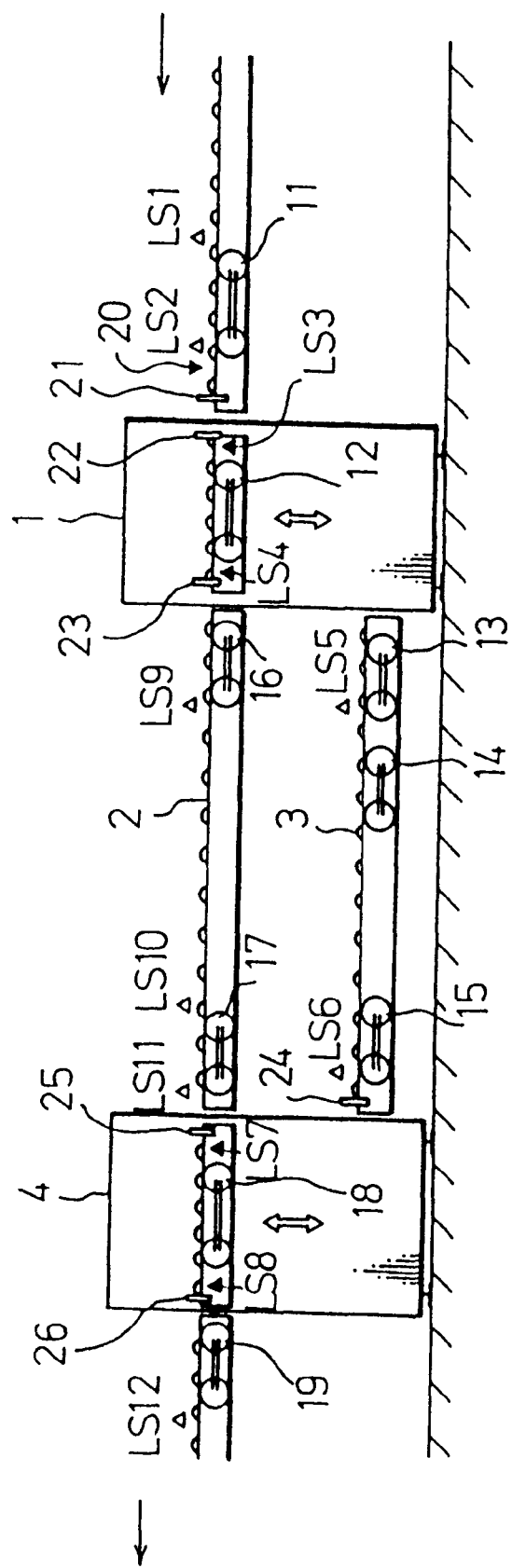

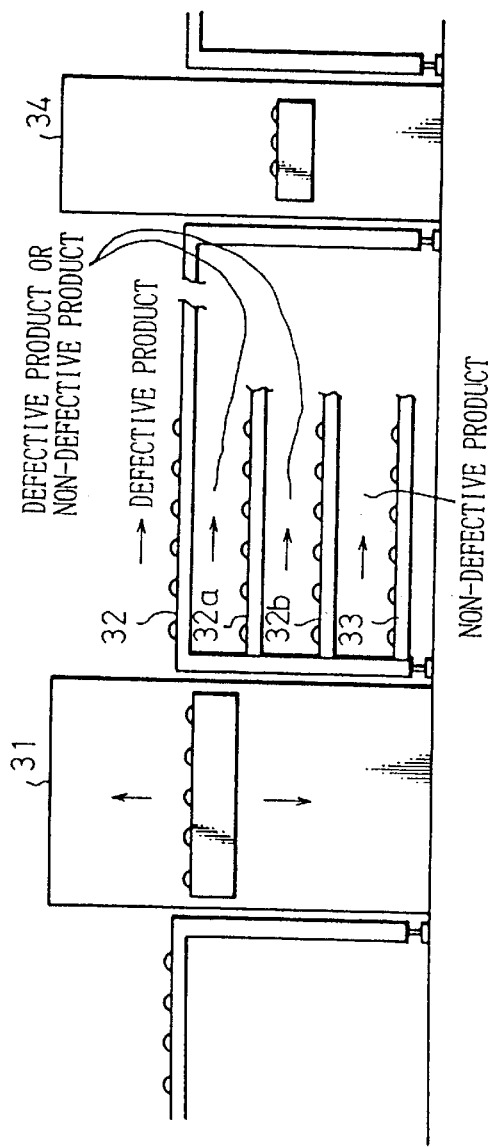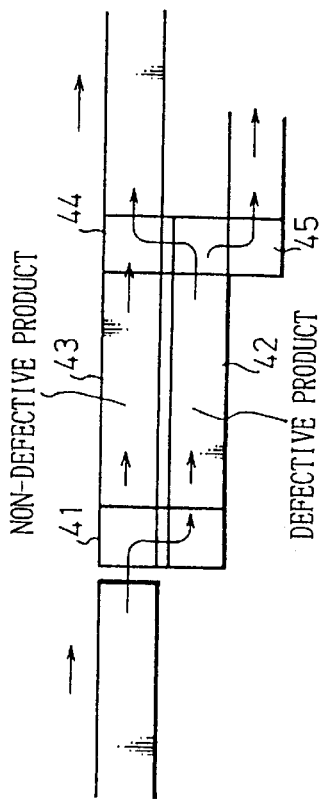

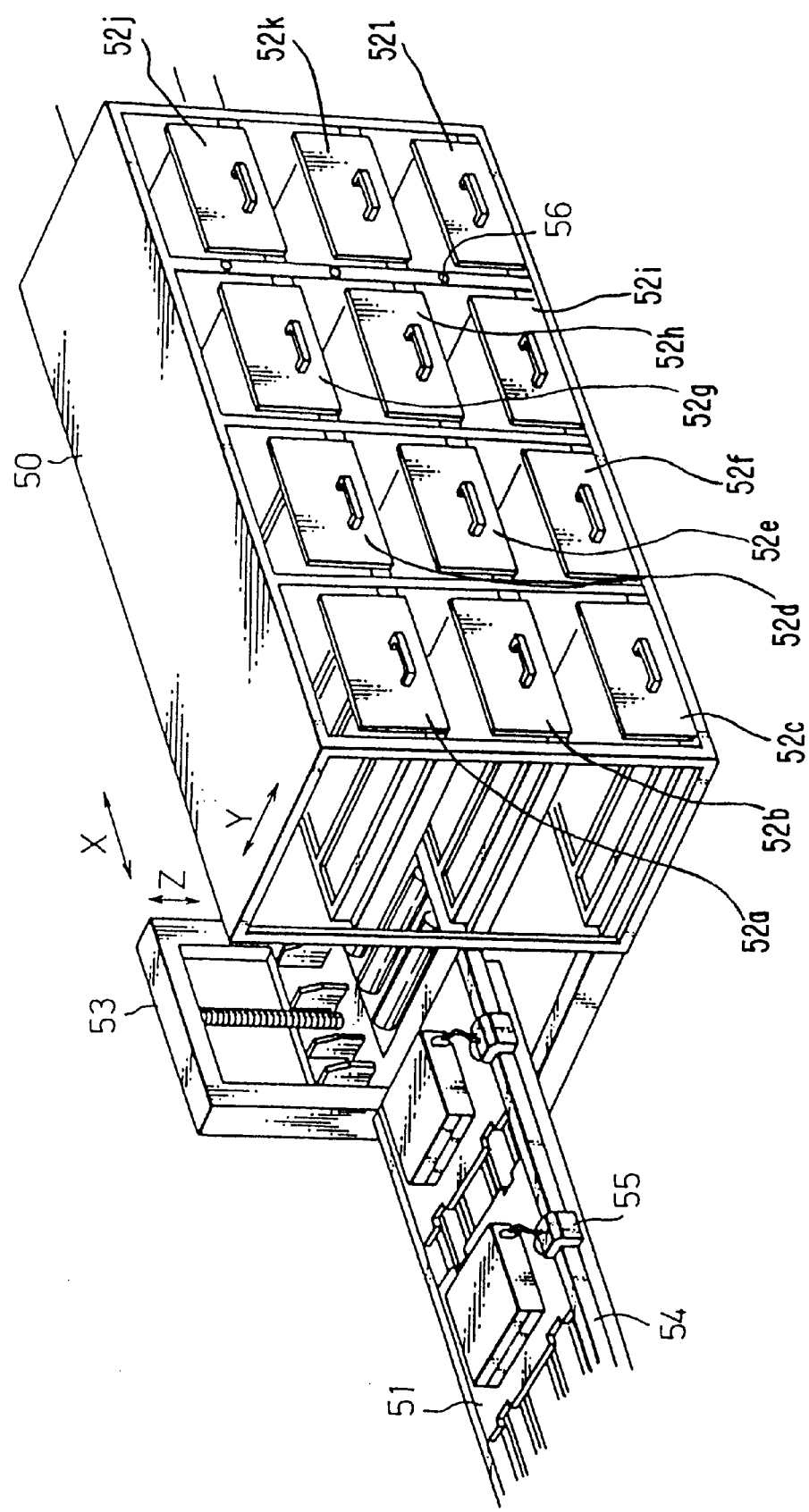

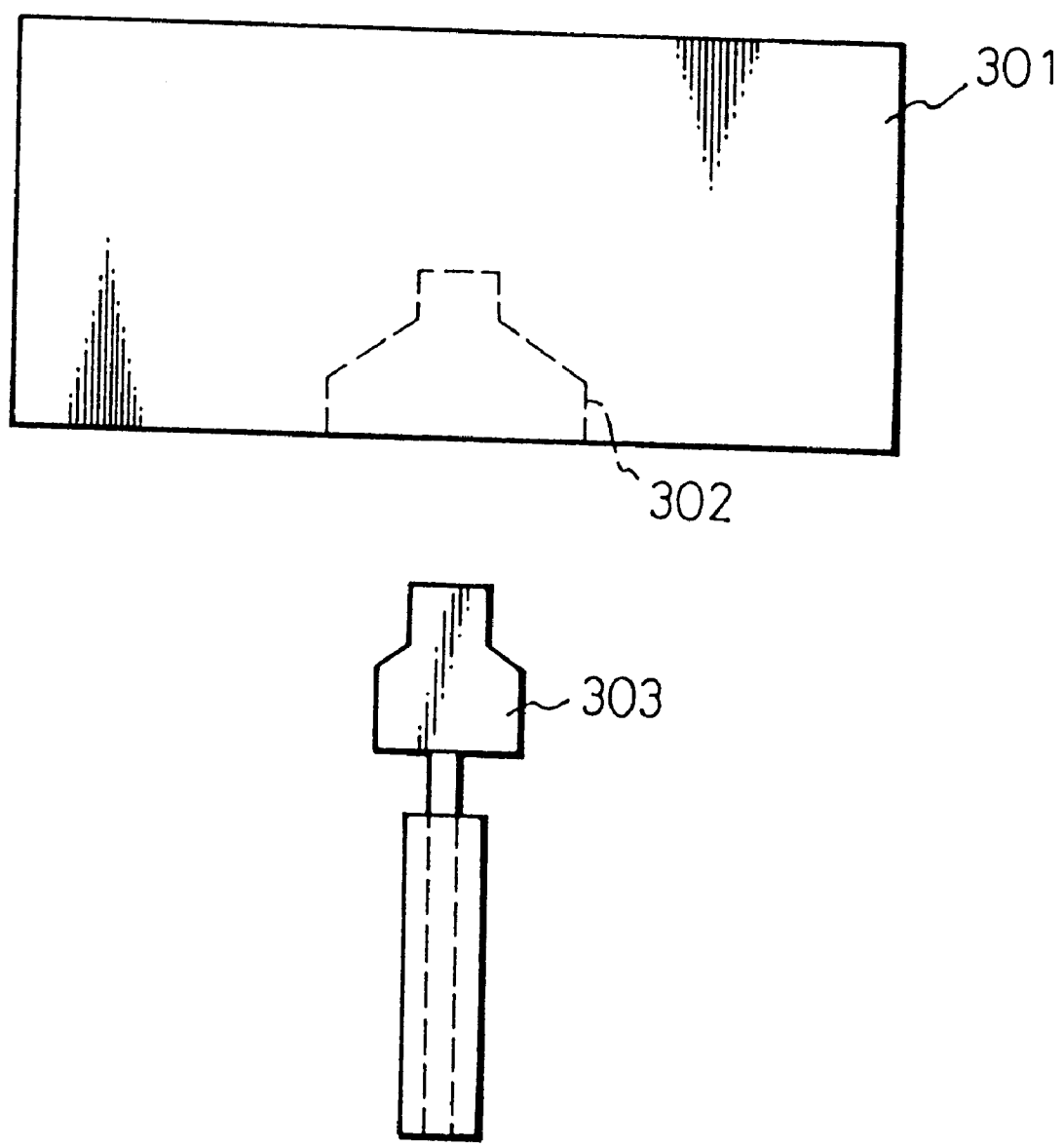

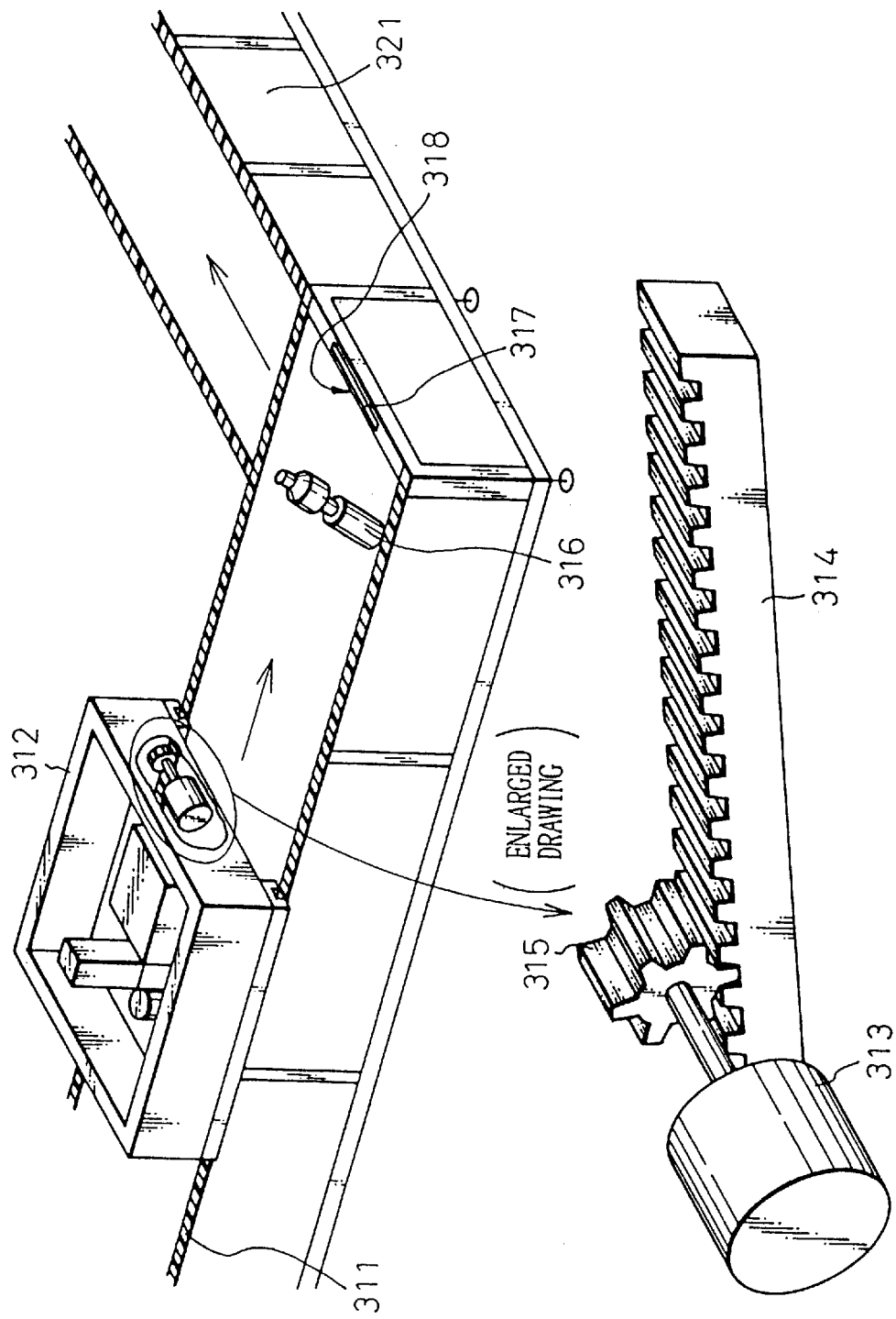

Fig.20A
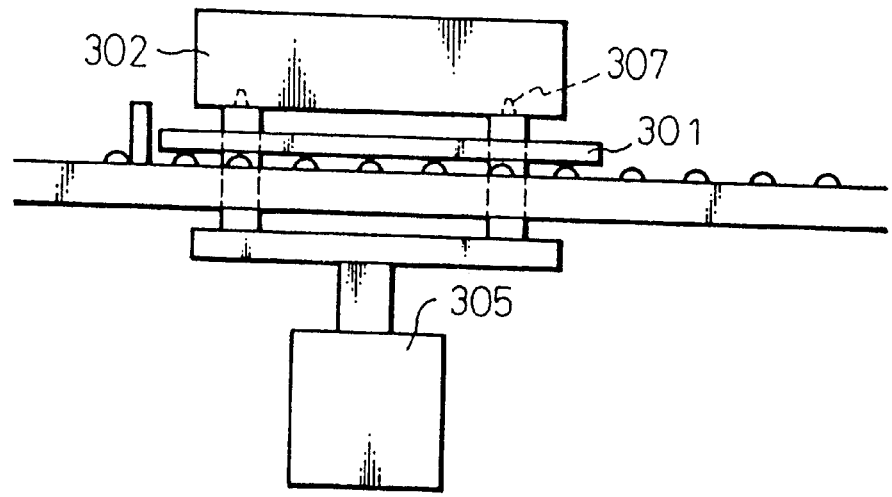
Fig.20B
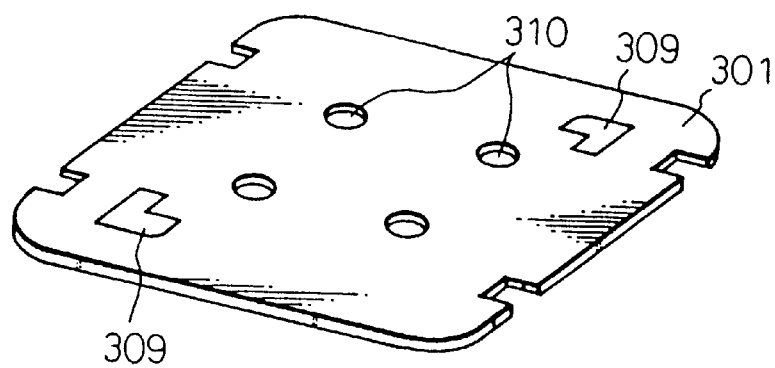
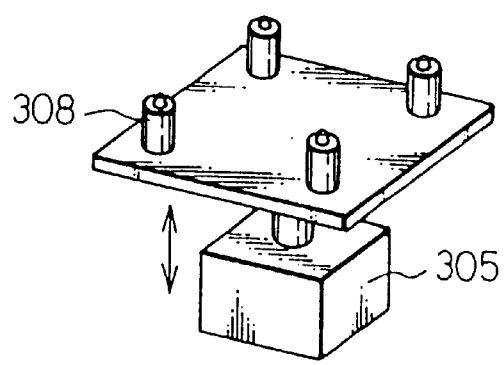

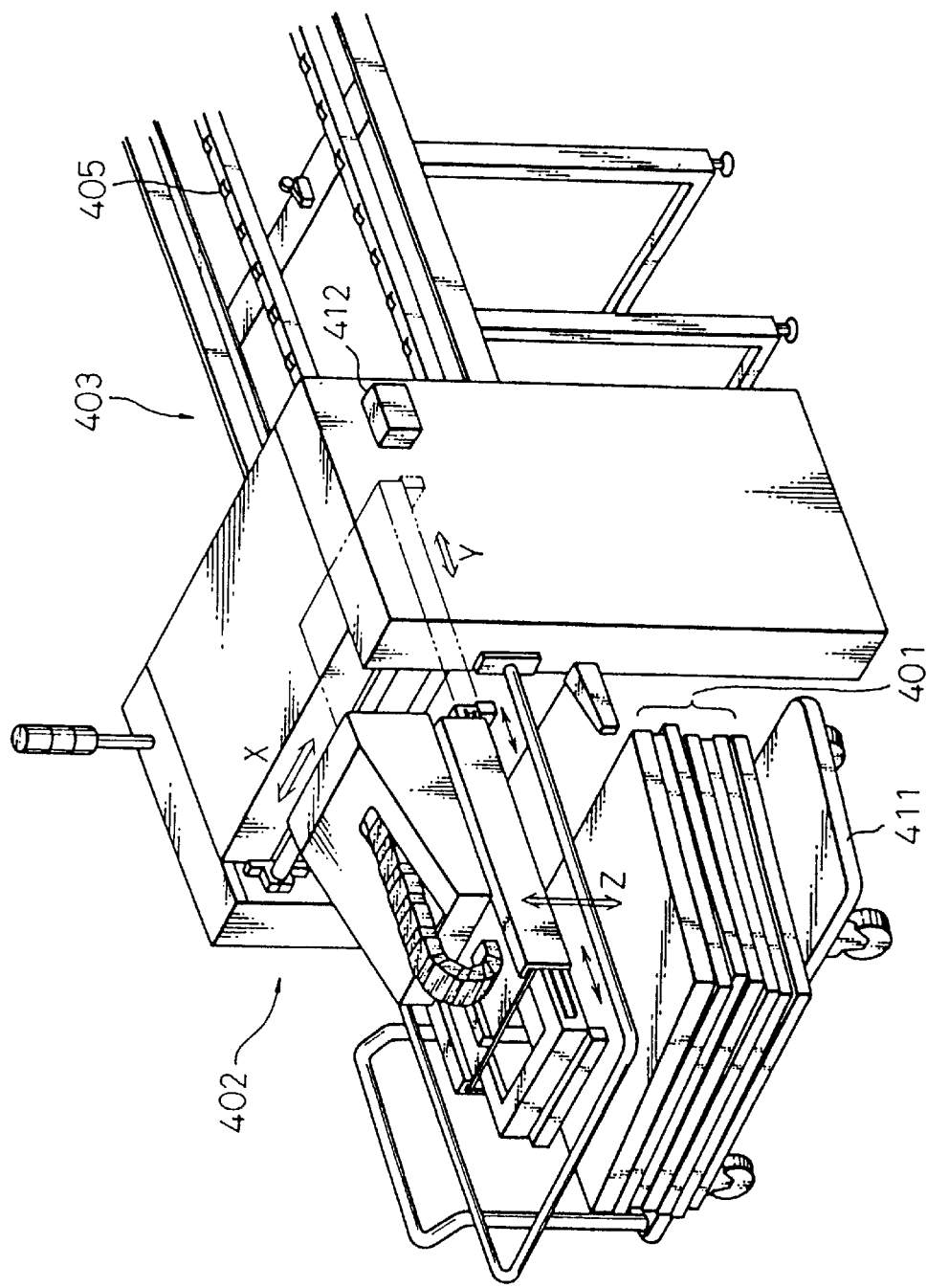

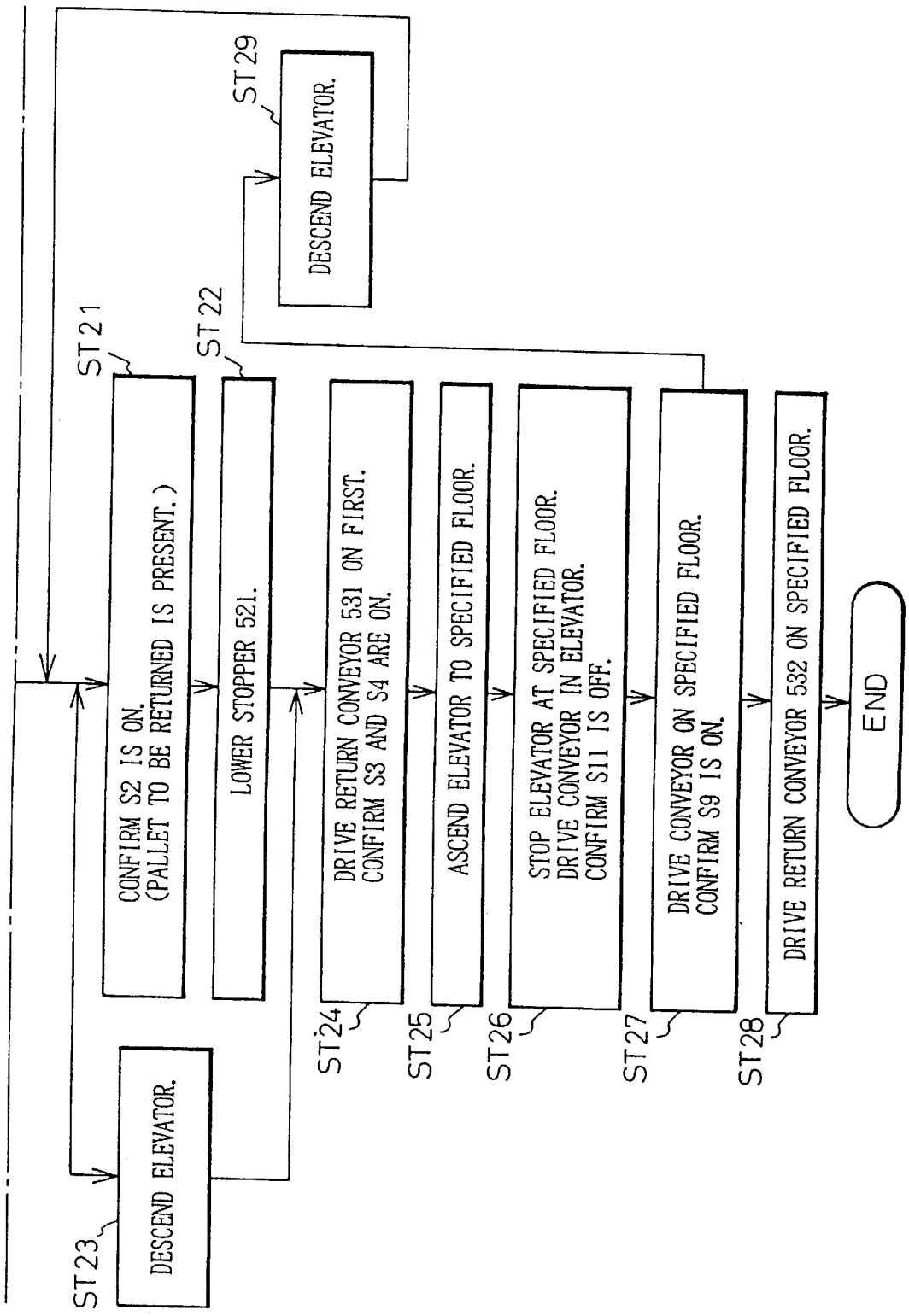

PALLET ROUTING SYSTEM FOR A VERSATILE PRODUCTION SYSTEM

This application is a division of application Ser. No. 08/026,064, filed Mar. 4, 1993, now U.S. Pat. No. 5,355,579.

BACKGROUND OF THE INVENTION

1. Field of the Invention

The present invention relates to a versatile production system employing a production line for producing different kinds of products.

2. Description of the Related Art

A production line involves various processes such as supplying parts, assembling the parts into products, testing the products, and conveying the products that have passed the test. When mass-producing products of a single kind, the production line may be used exclusively for producing the products. When producing different kinds of products in small quantities, there is a loss of factory space, facilities, and manpower if production lines must be prepared for the respective kinds of products.

To solve this problem, a versatile production system has been proposed. This system employs a single production line for producing different kinds of products. To flexibly produce required products in required quantities with a single production line, it is necessary to timely dispatch correct instructions to operators stationed at different locations along the production line, after taking into account the work contents, procedures, supplied parts, and quality control conditions of the locations. According to the instructions, the operators carry out tests, prepare test reports, and feed back defective products with work reports. This conventional system requires excessive time and labor in processing data and imposes a heavy load on the operators, thereby causing errors and deteriorating productivity.

The applicant of the present invention has proposed a versatile production system that flexibly produces different kinds of products in small quantities, automatically provides operators with proper instructions, informs downstream operators of data of defective upstream products, and prepares test reports.

This system separates defective products from non-defective products. The defective products are removed from the production line and conveyed to a repair station, where they are repaired and then returned to the production line.

For example, when producing disks for computers, it is necessary to write a test program to some disks. The writing process takes time. The disks are once removed from the production line, sent to a write station, and returned to the production line after the program is written to the disks. Transportation of the disks between the production line and the write station causes time loss and misplacement.

The conventional versatile production system must have a separate production line for some products whose size, in particular, height, exceeds a particular limit. This separate line may cause loss of space, facilities, and manpower.

When repairing and inspecting products supported on pallets, the pallets must be conveyed slowly. During this period, the pallets may hit one another, thereby hindering correct inspection or smooth production. In particular, when the products are computers, they are vulnerable to shock.

The production line must achieve predetermined accuracy in moving and positioning a product placed on a pallet. To provide such accuracy, the prior art gradually decreases the speed of motors, or employs servo motors, pulse motors, numerical controllers, and positioners.

When the production line employs robots for automatically assembling products, the precise positioning of a product on a pallet is very important. To provide this accuracy, conventional pallets employ jigs for positioning and fixing a product.

Numerical control positioners are very accurate but expensive. Other inexpensive positioners are not very accurate.

Before attaching a jig to a pallet, the pallet must be processed precisely. The pallets, therefore, are usually made of a metal such as aluminum. Aluminum die-cast pallets, for example, are heavy and expensive.

The positioning accuracy of a product on a pallet relative to a robot in a production line is determined by process errors in the pallet, assembling errors in a jig attached to the pallet, and dimensional errors in the product. These errors must be within respective allowances, which requires time, labor, and cost.

Empty pallets are fed individually to the start of a production line by workers. These workers must also carry out assembling work at the start of the production line. To reduce the work load of the workers, the feeding of pallets to the production line must be automated.

At an end of the production line, there is a packing terminal where products are picked up from pallets and packed. Emptied pallets are piled, and once a predetermined number of pallets are accumulated, they are transported to the start of the production line. When intervals of products conveyed to the packing terminal are long, there is extended idle time at the packing terminal. To reduce idle time, the packing terminal may deal with a plurality of production lines.

In this case, different kinds of pallets collect at the packing terminal and, therefore, workers must separate them according to type. In addition, separate conveyors must be prepared to return the pallets to the respective production lines. Accordingly, additional manpower is required to load and unload the pallets to and from the conveyors.

SUMMARY OF THE INVENTION

An object of the present invention is to provide a versatile production system for producing different kinds of products in small quantities.

Another object of the present invention is to provide a bypass structure employed for the versatile production system, for bypassing products for repairing or test program writing.

Still another object of the present invention is to provide a work table employed for the versatile production system. The height of the table is adjustable according to the height of products.

Still another object of the present invention is to provide a collision preventive mechanism employed for the versatile production system, for preventing pallets from hitting one another.

Still another object of the present invention is to provide an inexpensive accurate positioner employed for the versatile production system.

Still another object of the present invention is to provide a positioner employed for the verstaile production system. The positioner is capable of accurately positioning a product on a pallet with no jig, which makes the pallet light-weight, does not require precision manufacturing and is inexpensive.

Still another object of the present invention is to provide an automatic pallet feeder employed for the versatile production system so as to reduce the work load of workers.

Still another object of the present invention is to provide a collective packing system employed for the versatile production system, for automatically separating pallets of a plurality of production lines, and returning the pallets to the respective production lines without using separate conveyors, thereby eliminating the loading and unloading of the pallets to and from carts.

In order to accomplish the objects, the present invention provides a versatile production system employing a production line for assembling parts into different kinds of products, testing the products, and conveying the products that have passed the test to a packing terminal.

The system employs a bypass structure, which includes a first switcher, a main line, a bypass line, and a second switcher.

The first switcher communicates with a communication device disposed on a pallet or on a product placed on the pallet conveyed along the production line so as to determine whether or not the product is defective and to determine the kind of product. According to the determination, the first switcher switches the pallet from the production line to one of the main and bypass lines.

The main line receives pallets with products switched thereto by the first switcher and conveys them.

The bypass line receives pallets with products switched thereto by the first switcher and conveys them slower than the main line, or temporarily stops them, so that the products may be repaired and tested.

The second switcher returns the pallets and products from the main and bypass lines to the production line.

At least one such bypass line is disposed parallel to the main line.

The bypass line may involve a shelf for retaining pallets, each carrying a product.

The bypass line may have a shelf having retaining spaces arranged in a horizontal row, or in a vertical column, or in horizontal rows and vertical columns. The bypass line may include a carrier, which is movable in two or three axial directions depending on the structure of the shelf, for storing a pallet with a product from the production line into any one of the retaining spaces of the shelf, and returning the pallet and product from the shelf to the production line.

The bypass structure may have a power supply unit for continuously supplying electricity to a product held by a pallet while the pallet and product are being conveyed along the production line, being stored in the shelf, and being transferred between the production line and the shelf.

The system may include a work table at each work station along the production line, to assemble and test products. The work table includes a conveyor disposed on the production line, for conveying each pallet with a product, and a vertical drive unit for adjusting the level of the work table to the level of the conveyor when moving the pallet and product between the conveyor and the work station, and to an optional level depending on the height of the product so that the product may be easily assembled and tested.

The system may have a conveyor system for conveying pallets each carrying a product along the production line. The conveyor system includes conveyors for conveying the pallets, motors for driving the conveyors, stoppers for preventing the pallets on a given conveyor from being fed onto a downstream conveyor, if the downstream conveyor is full of pallets, sensors for detecting the positions of the pallets conveyed on the conveyors, controllers for receiving signals from the sensors and controlling the motors such that a given conveyor is stopped just before a first pallet conveyed by the given conveyor hits a second pallet that is present in front of the first pallet, and a communication device for exchanging ON/OFF statuses of signals of the sensors between the controllers.

The system may have a positioner for positioning a product on a pallet conveyed along the production line. The pallet has guides for supporting the product substantially at a given position on the pallet, and holes facing the bottom of the product. The product has taper pin receivers on the bottom thereof. The positioner includes taper pins to be pushed up toward the product when the pallet with the product is stopped at a predetermined position in the production line. The taper pins couple with the taper pin receivers of the product, to lift and fix the product. The taper pins are pulled down after a given time to again place the product on the pallet. The positioner also includes a controller responding to a signal provided by a sensor disposed at the predetermined position in the production line. The controller stops the pallet at the position and controls an actuator to raise the taper pins and retract them after the given time.

The taper pin receivers may be formed on the side faces of a product. In this case, the taper pins horizontally advance toward the product orthogonally to the moving direction of the pallet, engage with the taper pin receivers to fix the product, and retract after a given time.

The versatile production system may have a pallet feeder for feeding pallets individually to the production line.

The pallet feeder has a lateral aligner for laterally aligning a pallet with respect to a conveying direction of the pallet, a longitudinal aligner holder for longitudinally aligning and holding the pallet, a feeder for feeding the pallet to the start of the production line, a vertical driver for vertically moving the lateral aligner, longitudinal aligner holder, and feeder, and a controller. The controller controls the vertical driver to move in a downward direction, the longitudinal aligner holder to hold the top pallet stacked beside the pallet feeder; the vertical driver to move in an upward direction; the lateral aligner to laterally align the pallet; the feeder to push the pallet toward the production line; the longitudinal aligner holder to release the pallet onto the production line, the feeder to retract, and these operations are repeated.

The versatile production system may have a collective packing system. The packing system collects different kinds of pallets carrying different kinds of products from a plurality of production lines, packs the products, and returns the emptied pallets to the respective production lines.

The packing system has a main conveyor for conveying pallets with products from the production lines to a packing terminal and returning the pallets from the packing terminal to the respective production lines, a return destination selector for identifying the pallets conveyed on the main conveyor and sorting the pallets for respective production lines to which they are returned, a conveyor disposed along each of the production lines, for conveying pallets with products along the production line up to the main conveyor, and a pallet detector disposed at an end of each of the production lines, for detecting a pallet with a product to be transferred from the conveyor onto the main conveyor. The main conveyor is controlled to return pallets from the packing terminal to one of the production lines specified by the return destination selector after the pallet detector confirms that there is no pallet at the end of the specified production line.

The return destination selector has a pallet identification unit that receives information about the characteristics of each conveyed pallet from a sensor that detects the product mounting area, thickness, and shape of the pallet, or from a bar code reader that reads a bar code attached to the pallet, or from a communication device that communicates with another communication device disposed on the pallet. The identification unit compares the received information with preset pallet data so as to identify the production line that has delivered the pallet.

The collective packing system may have switchers for changing the conveying direction of a pallet. Each of the switchers has a stopper that ascends to stop a pallet and descends to pass the pallet, a roller conveyor having a level of low friction for conveying the pallet with the inertia of the pallet, a belt conveyor crossing the roller conveyor, the belt conveyor ascending to lift the pallet from the roller conveyor and convey the pallet and descending to leave the pallet on the roller conveyor, a sensor for detecting whether or not the pallet is present on the roller or belt conveyor, a motor for driving the belt conveyor, and a controller for pushing up the stopper to stop the pallet when changing the conveying direction of the pallet, ascending the belt conveyor after the sensor detects the presence of the pallet, and driving the belt conveyor motor, thereby changing the conveying direction of the pallet.

The bypass structure mentioned above transfers products from the production line to the main or bypass line. The main line passes the products as they are to the next process. The bypass line repairs or writes a test program to the products. This arrangement enables products to be repaired or manipulated in the vicinity of the production line.

The bypass line may involve a plurality of horizontally or vertically arranged conveyor paths depending on factory layout or work conditions.

The products bypassing the production line may be temporarily stored in a shelf and returned to the production line after a period of time. During this period, the products may continuously receive electricity.

The work table arranged at each work station along the production line is ascended and descended according to the size of a product to be assembled and tested.

The sensors arranged along the conveyors detect pallets conveyed on the conveyors. The sensors stop conveyor motors before the pallets hit each other. After the conveyor motors are stopped, the pallets slide over rollers of the conveyors and make light contact with each other.

For positioning purposes, each product may have a taper pin receiver. The product is horizontally and approximately positioned by a driver through a clutch. A taper pin is raised to engage with the taper pin receiver of the product, thereby positioning the product.

When automatically assembling products in a production line, each product is stopped at a predetermined position by stopping a conveyor. Taper pins disposed at the position are raised by exciting a solenoid valve of an air cylinder. The taper pins engage with taper pin receivers of the product, to lift and fix the product. Then, a robot assembles and processes the product. Thereafter, the taper pins are lowered to place the product on the conveyor. The conveyor is driven to transport the product to the next process.

The pallet feeder of the present invention automatically feeds pallets individually from a cart to the start of a production line. When a start button of the pallet feeder is pushed, a storage circuit of a programmable controller stores information indicating that the pallet feeder is in operation, until a reset button is pushed. A Z-axis motor of the pallet feeder is driven in a forward direction to lower the pallet base and pallet holder of the feeder. When the pallet base comes into contact with the top pallet, the Z-axis motor is stopped. The pallet holder is driven to hold the top pallet. The Z-axis motor is driven in a reverse direction to lift the pallet holder with the pallet. The Z-axis motor is stopped when the pallet is lifted to the level of a roller conveyor. An X-axis motor is driven so as to laterally position the pallet. After a sensor on the roller conveyor detects that there is no pallet on the conveyor, a Y-axis motor is driven to bring the pallet above the conveyor, and the pallet holder is released to drop the pallet onto the conveyor. When the sensor on the conveyor detects that there is a pallet, the Z-axis motor is driven in the reverse direction to lift the pallet base to the original position.

Pallets with products are transported from production lines to the main conveyor. The main conveyor conveys the pallets and products to the collective packing terminal. The pallet identification unit at the packing terminal determines the kinds of pallets. The return destination separator separates the pallets for their return destinations. The products are removed from the pallets and packed, and the emptied pallets are conveyed from the packing terminal to the respective production lines.

BRIEF DESCRIPTION OF THE DRAWINGS

FIG. 1 shows a basic model of a bypass system for a versatile production system according to the present invention;

FIG. 2 shows a bypass system according to the present invention;

FIG. 3 shows another bypass system according to the present invention;

FIG. 4 shows still another bypass system according to the present invention;

FIG. 5 shows still another bypass system according to the present invention;

FIG. 18 shows a basic model of a positioner according to the present invention;

FIG. 19 shows an application of the positioner of FIG. 18;

FIG. 20A is a side view showing another positioner according to the present invention;

FIG. 20B is a perspective view showing the positioner of FIG. 20A;

FIG. 22 shows pallets being fed to the start of a production line;

FIG. 28B is another half part of a flowchart showing the operation of the collective packing system.

DESCRIPTION OF THE PREFERRED EMBODIMENTS

Figure 6:
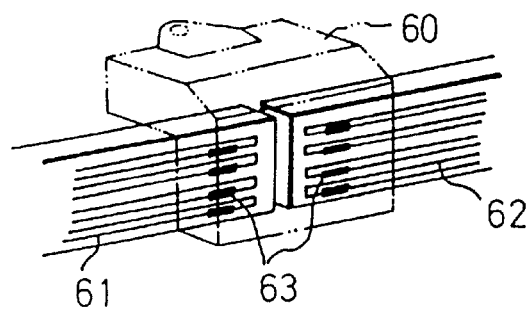
FIG. 6 shows a pallet moving from a production line to a triaxial carrier.

FIG. 1 shows a basic model of a bypass system employed for a versatile production system according to the present invention. In the figure, products are conveyed from the right side to the left side.

The bypass system includes a first switcher 1, an upper bypass line 2, a lower main line 3, and a second switcher 4. The first switcher 1 has a lifter used to transfer non-defective products to the main line 3 and defective products to the bypass line 2.

The bypass line 2 has a conveyor for slowly conveying the defective products to the second switcher 4. During this period, workers repair the defective products on the conveyor. To make the repair work easier for the workers, the bypass line 2 is located above the main line 3.

The main line 3 conveys the non-defective products from the first switcher 1 to the second switcher 4. The second switcher 4 has a lifter for receiving the repaired products from the bypass line 2 and the non-defective products from the main line 3.

FIG. 2 shows a bypass system according to an embodiment of the present invention. The bypass system includes limit switches LS1 to LS12, conveyors 11 to 19, an ID terminal 20 serving as a communication device, and stoppers 21 to 26. The conveyors 11 to 19 are driven by motors. The stoppers 21 to 26 each have an air cylinder for moving the stopper up and down. The limit switches LS1 to LS12 each provide an ON/OFF signal to a programmable controller.

Each pallet conveyed through the bypass system has an ID unit serving as a communication storage unit. The ID terminal 20 communicates with the ID unit of each pallet, the programmable controller, and a floor controller. The programmable controller starts and stops the conveyor motors.

Each pallet carrying a product is conveyed through the bypass system from the right side to the left side. The pallet turns ON the limit switch LS1 to start the conveyor 11, and then turns ON the limit switch LS2 to stop the conveyor 11. The ID terminal 20 reads data out of the ID unit of the pallet, to determine whether or not the product on the pallet is defective.

If it is defective, the stoppers 21 and 22 are lowered, the conveyors 11 and 12 are driven, and the pallet is moved to the first switcher 1. When the pallet turns ON the limit switch LS4, the conveyors 11 and 12 are stopped, the stoppers 21 and 22 are raised, the stopper 23 is lowered, the conveyors 12 and 16 are moved, and the pallet is fed onto the upper bypass line 2. When the pallet turns ON the limit switch LS9, the conveyor 12 is stopped, and the stopper 23 is raised.

When the pallet turns ON the limit switch LS10, the conveyor 17 is driven. When the pallet turns ON the limit switch LS11, the conveyor 18 is driven to guide the pallet into the second switcher 4. When the pallet turns ON the limit switch LS8, the conveyors 17 and 18 are stopped, the stopper 25 is raised, the stopper 26 is lowered, the conveyors 18 and 19 are driven, and the pallet is sent out of the second switcher 4. When the pallet turns ON the limit switch LS12, the conveyor 18 is stopped, and the stopper 26 is raised.

If the ID terminal 20 determines that the product is non-defective, the stoppers 21 and 22 are lowered, the conveyors 11 and 12 are driven, and the pallet is fed into the first switcher 1. When the pallet turns ON the limit switch LS4, the conveyors 11 and 12 are stopped, the stoppers 21 and 22 are raised, the lifter of the switcher 1 descends, the stopper 23 is lowered, the conveyors 12 and 13 are driven, and the pallet is fed onto the main line 3.

When the pallet turns ON the limit switch LS5, the stopper 23 is raised, the lifter of the first switcher 1 ascends, and the conveyor 14 is driven. Conveyors from 14 to 15 are successively driven to transport the pallet. When the pallet turns ON the limit switch LS6, the lifter of the second switcher 4 descends, the stopper 25 is lowered, the conveyors 15 and 18 are driven, and the pallet is fed into the second switcher 4. When the pallet turns ON the limit switch LS8, the stopper 25 is raised, and the lifter of the switcher 4 ascends. The stopper 26 is lowered, the conveyors 18 and 19 are driven, and the pallet is fed out of the switcher 4. When the pallet turns ON the limit switch LS12, the stopper 26 is raised, and the conveyor 18 is stopped.

If there are unrepairable defective products, they are passed through an unrepairable product branch (not shown) and transferred to an off-line conveyor, which guides the product to a predetermined location.

FIG. 3 shows another bypass system according to the present invention. This system includes a first switcher 31, three bypass lines 32, 32a, and 32b, a main line 33, and a second switcher 34. The switchers 31 and 34 each have a lifter that stops at any one of the main and bypass lines. With the three bypass lines, defective products remain for a longer time for repairing. The operation of the embodiment of FIG. 3 is the same as that of the embodiment of FIG. 2 except that each lifter stops at each of the four positions.

FIG. 4 shows still another bypass system according to the present invention. This system includes a first switcher 41, a bypass line 42 for conveying and repairing defective products, a main line 43 for conveying non-defective products, and a second switcher 44. Unlike the previous embodiments, the bypass and main lines 42 and 43 run parallel to each other. Accordingly, the switchers 41 and 44 horizontally switch a flow of products. The operation of this embodiment is basically the same as that of the embodiment of FIG. 2, except that products are horizontally branched. The bypass system of FIG. 4 includes an unrepairable product branch 45, through which unrepairable products are transferred to an off-line conveyor and guided to a predetermined location.

FIG. 5 shows still another bypass system according to the present invention. This system employs a shelf 50 as a bypass line. The shelf 50 has twelve receivers 52a–52l arranged in three rows and four columns.

A pallet 51 with a product is conveyed along a production line to a triaxial carrier 53. The triaxial carrier 53 conveys the pallet 51 to one of the receivers of the shelf 50 where the pallet 51 is temporarily stored.

When the product is, for example, a disk for a computer, the shelf 50 is used to write a test program to the disk. In this case, the product on the pallet 51 must always receive electricity while the product is conveyed along the production line and kept in the shelf 50. For this purpose, this embodiment employs a power supply system. Namely, the pallet 51 has a trolley 55, which slides along a power supply rail 54 arranged along the production line.

The triaxial carrier 53 is linearly moved in a direction X by a conveyor motor, (not illustrated) in a direction Y by an air cylinder (not illustrated), and in a direction Z by a servo motor (not illustrated).

The shelf 50 has switches 56 (only one is depicted in FIG. 5) used to impart the fact that a program has been written to a disk. Pallets 51, each holding a product, are successively stored in vacant receivers 52a–52l of the shelf 50. After data is written to the products, pallets 51 are successively returned to the production line.

When moving a pallet 51 to and from the shelf 50, the triaxial carrier 53 detects X and Y positions with photoelectric sensors (not illustrated) and a Z position with pulses provided by an encoder (not illustrated) fitted to a shaft of the servo motor. The triaxial carrier 53 is controlled by a programmable controller.

The number of receivers 52a–52l and their arrangement in rows and columns in the shelf 50 are determined according to requirements.

The power supply system of the shelf 50 will be explained.

FIG. 6 shows a process of moving a pallet from the production line to the triaxial carrier 53. A trolley 60 is fixed to a side face of the pallet, so that the trolley 60 moves with the pallet. Before storing the pallet on the shelf 50, a pallet jig stored in the shelf 50 is brought to a position where the pallet is transferred from the production line to the triaxial carrier 53. The trolley 60 of the pallet moves from a rail 61 of the production line onto a rail 62 of the pallet jig.

Figure 7:
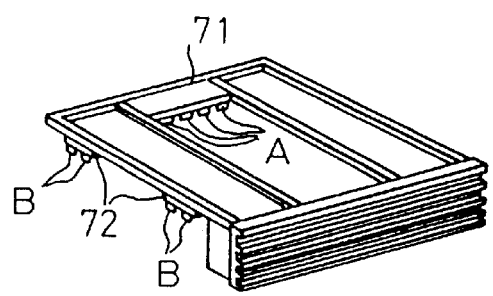
FIG. 7 shows a pallet jig for a shelf.

FIG. 7 shows an example of the pallet jig stored in the shelf 50. The pallet jig has copper plates 71 and 72. The copper plate 71 has four power supply contacts A to be connected to the triaxial carrier 53. The copper plate 72 has four power supply contacts B to be connected to the shelf 50.

Figure 8:
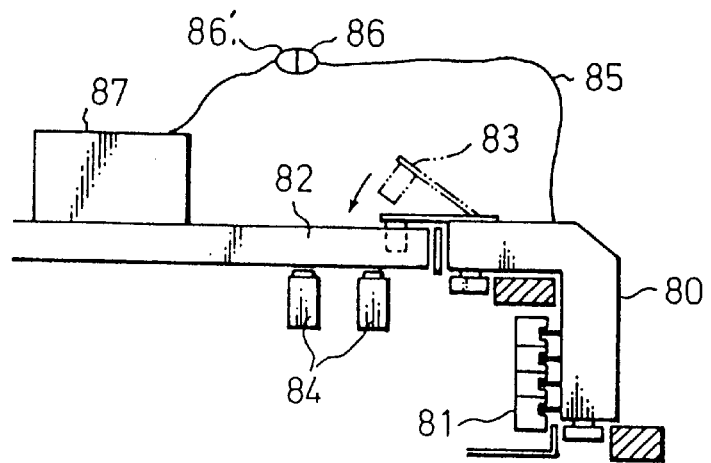
FIG. 8 is a sectional view showing a trolley.

FIG. 8 is a sectional view showing a trolley 80. The trolley 80 is fixed to a pallet 82 with a clamp 83. The trolley 80 receives electricity from a current collect rail 81 of the production line or of a pallet jig. The trolley 80 has a cable 85 having a connector 86. The connector 86 is coupled with a connector 86' of a product 87 supported by the pallet 82. Rollers 84 are arranged under the pallet 82 so that the pallet 82 moves smoothly.

Figure 9:
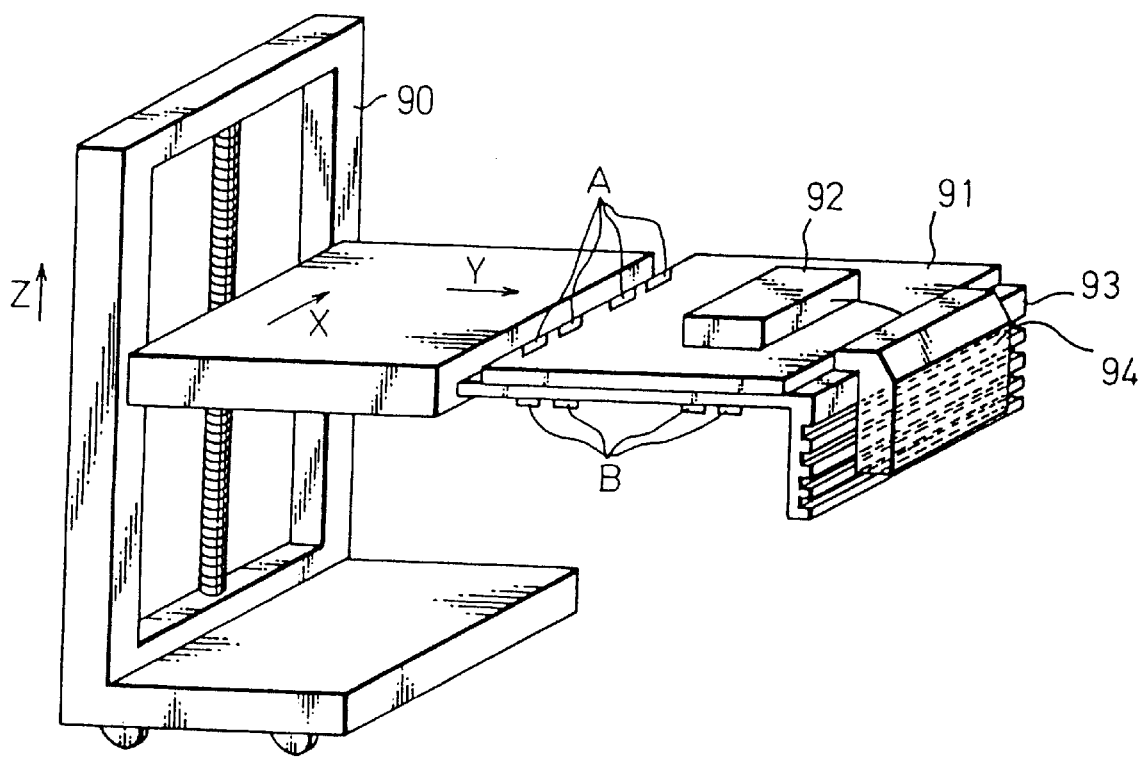
FIG. 9 explains a process of moving a pallet from a triaxial carrier to a shelf.

FIG. 9 shows a triaxial carrier 90 for carrying a pallet into a shelf. The triaxial carrier 90 takes a pallet jig 93 out of the shelf. A pallet 91 conveyed along the production line is put on the pallet jig 93. The triaxial carrier 90 brings the pallet jig 93 with the pallet 92 into the shelf. In FIG. 9, an arm of the carrier 90 is in the shelf. The pallet jig 93 has contacts A and B. A product 92 set on the pallet 91 receives electricity through contacts A' (shown in FIG. 10) of the carrier 90, the contacts A of the pallet jig 93, and a trolley 94.

Figure 10:
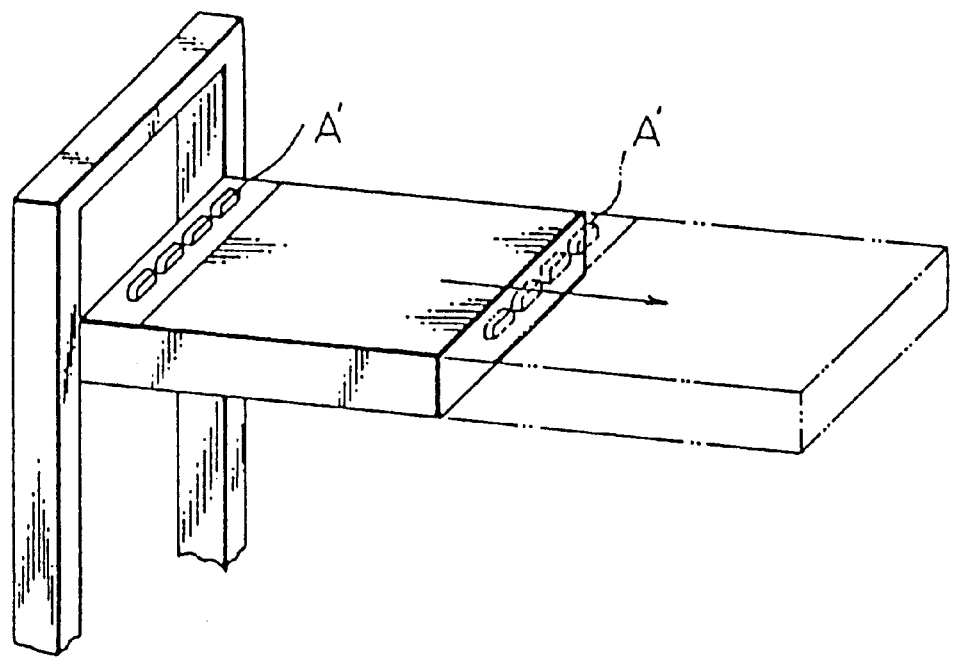
FIG. 10 shows contacts A' of the triaxial carrier, to be in contact with a pallet jig.

FIG. 10 shows the contacts A' of the triaxial carrier 90. The contacts A' engage with the contacts A of the pallet jig. The contacts A' of the carrier 90 receive electricity from a spiral cable suspended from above.

Figure 11:
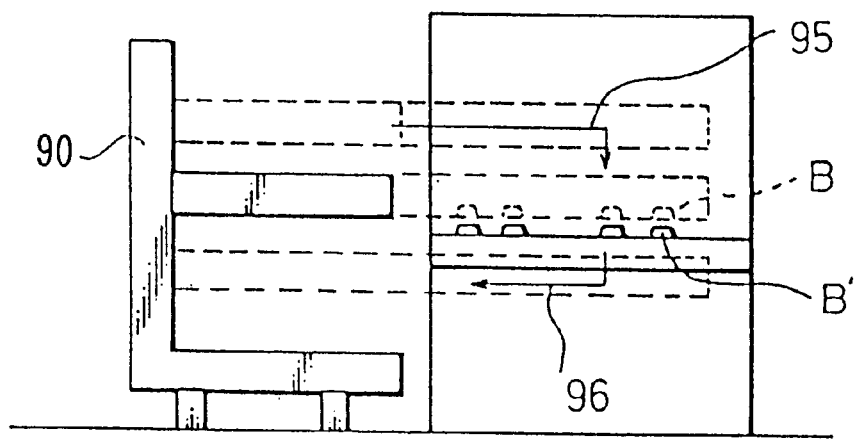
FIG. 11 shows the triaxial carrier moving a pallet to and from a shelf.

FIG. 11 shows the triaxial carrier 90, which stores a pallet on a shelf and returns to the original position. As indicated with an arrow mark 95, the pallet having a product is placed on a pallet jig, which is positioned on the arm of the triaxial carrier 90. In the shelf, the arm of the carrier 90 is lowered so that the contacts B of the pallet jig engage with contacts B' of the shelf. As indicated with an arrow mark 96, the arm of the carrier 90 is further lowered and returned to the original position. The product receives electricity from the shelf through the contacts B' of the shelf, the contacts B of the pallet jig, and a trolley attached to the pallet.

Figure 12:
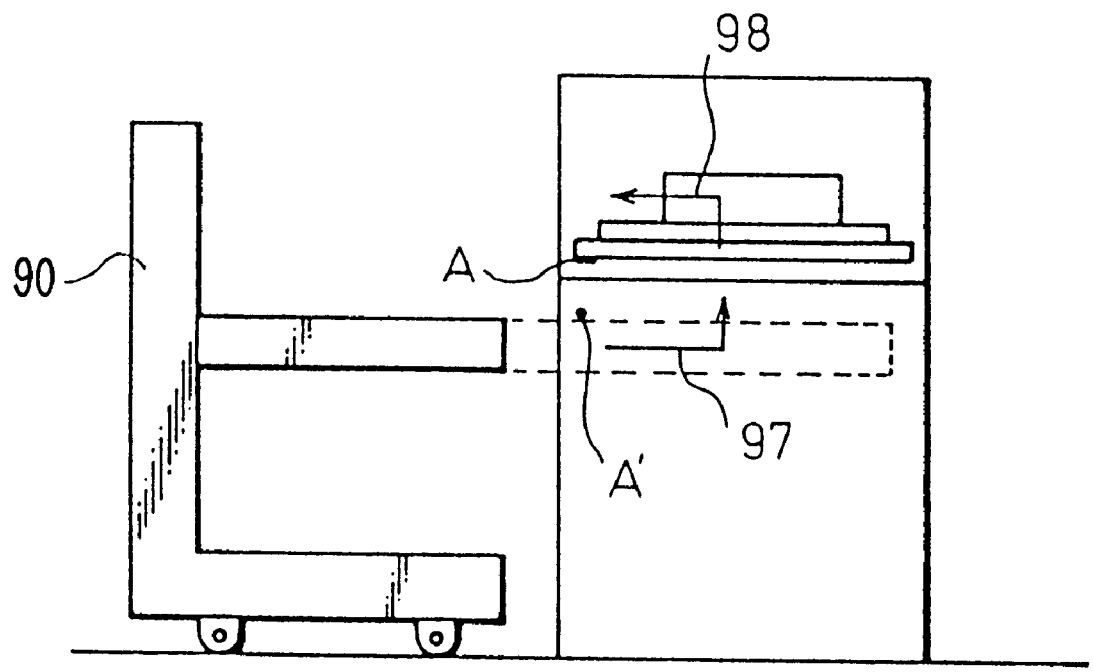
FIG. 12 shows the triaxial carrier returning a pallet from a shelf to a production line.

FIG. 12 shows a process of returning a pallet from the shelf to the triaxial carrier 90. As indicated with an arrow mark 97, the arm of the carrier 90 is lifted up so that the contacts A' of the arm of the carrier 90 engage with the contacts A of the pallet jig on which the pallet with the product is positioned. As indicated with an arrow mark 98, the arm of the carrier 90 supporting the pallet returns to the production line.

Figure 13A:
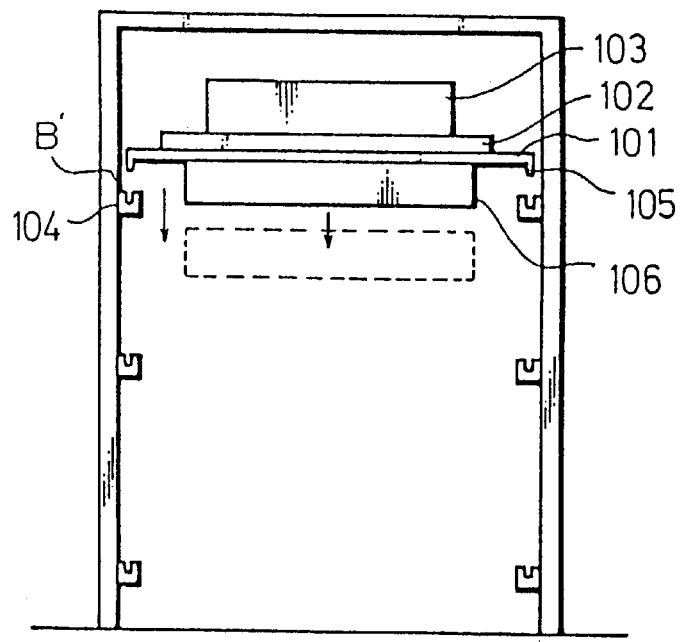
FIG. 13A explains a power supply process when the triaxial carrier stores a pallet on a shelf.
Figure 13B:
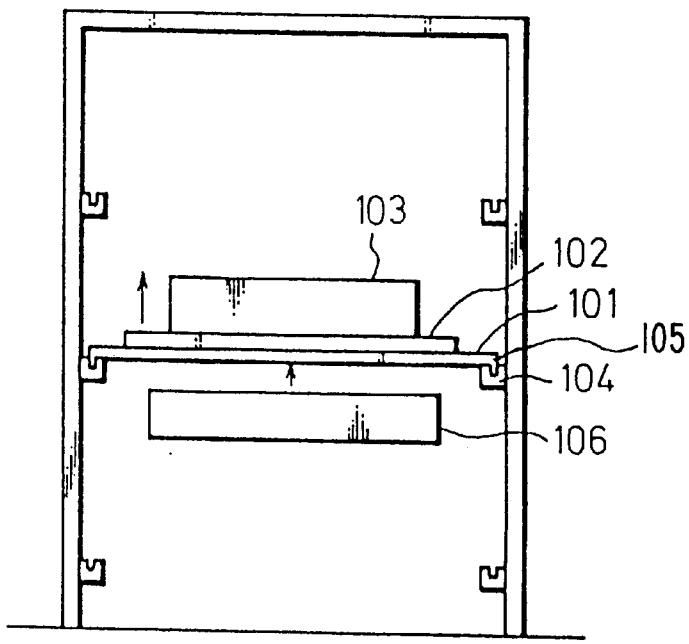
FIG. 13B explains a power supply process when the triaxial carrier returns the pallet from the shelf to a production line.

FIG. 13A shows the process of storing a pallet on a shelf using the triaxial carrier, and FIG. 13B shows a process of returning the pallet from the shelf to the production line using the triaxial carrier. A pallet jig 101 supports the pallet 102 on which a product 103 is set. The pallet jig 101 has hooks 105 that are supported by pallet guides 104. In FIG. 13A, the arm 106 of the triaxial carrier is lowered and brought to an original position. In FIG. 13B, the arm 106 of the carrier is lifted up to carry the pallet 102 back to the production line. The arm 106 lifts the pallet 102 until the hooks 105 of the pallet are removed from the pallet guides 104. Thereafter, the arm 106 brings the pallet 102 back to the production line. The product 103 receives electricity from the triaxial carrier through the contacts A' of the carrier, the contacts A of the pallet jig 101, and a trolley attached to the pallet 102.

Figure 14A:
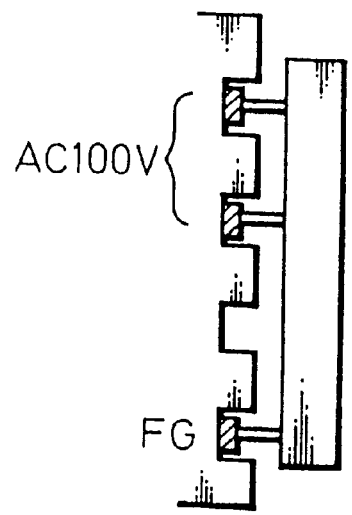
FIG. 14A shows a current collector of a trolley with a current flowing between first and second terminals.
Figure 14B:
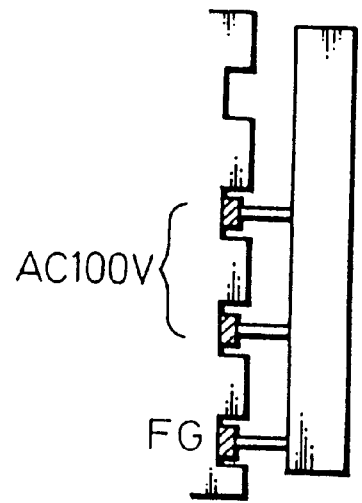
FIG. 14B shows a current collector of a trolley with a current flowing between second and third terminals.
Figure 14C:
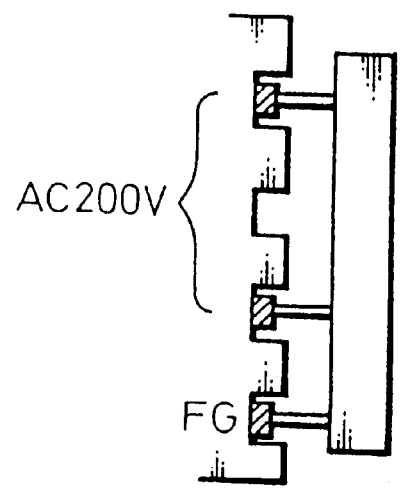
FIG. 14C shows a current collector of a trolley with a current flowing between first and third terminals.

FIGS. 14A to 14C show examples of current collectors of trolleys. In FIG. 14A, AC power of 100 V is supplied between first and second terminals. In FIG. 14B, AC power of 100 V is supplied between second and third terminals. In FIG. 14C, AC power of 200 V is supplied between first and third terminals. Each of the three examples is a single-phase three-line type.

As explained above, a versatile production system according to the present invention employs a bypass line for bypassing products and a main line for transferring products as they are to the next process. The products conveyed through the bypass line are repaired or written with a test program. This system requires no off-line route. It is possible to employ a shelf for temporarily storing products from a production line. The products are processed in the shelf and then returned to the production line. During this period, the products always receive electricity.

Figure 15A:
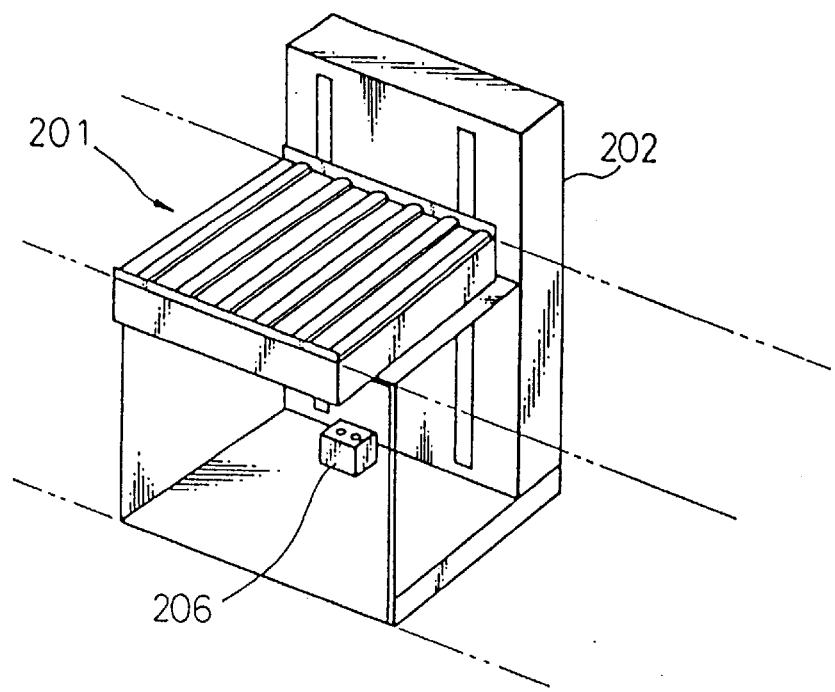
FIG. 15A shows a lifter with a cover according to the present invention.
Figure 15B:
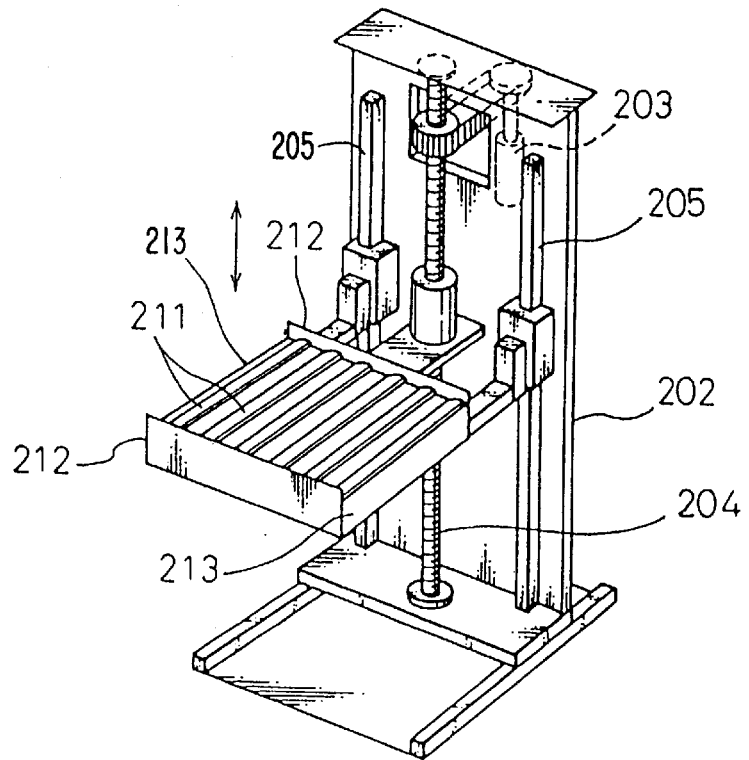
FIG. 15B shows the lifter of FIG. 15A without the cover.

FIGS. 15A and 15B show a lifter employed for a versatile production system according to the present invention, in which FIG. 15A shows the lifter with a cover, and FIG. 15B shows the same without the cover.

The lifter has a table 201. The table 201 includes rollers 211, two frames 212, and other two frames 213. The rollers 211 are arranged orthogonally to a production line and parallel to the floor. The rollers 211 are rotatably fixed to the frames 212 through bearings. The frames 212 and 213 define a square face for receiving a product on the table 201. The table 201 is supported by a threaded shaft 204 and two rails 205 installed on a base 202. The threaded shaft 204 is turned by a motor 203 so that the table 201 may move up and down. The up and down movements of the table 201 are controlled by an operator through a switch box 206.

The table 201 is usually set to the level of a conveyor (not shown) of a production line, and is adjusted through the switch box 206 depending on the height of products. The table 201 can be lowered 200 mm to 300 mm from the level of the conveyor. This adjustability improves workability and enables a single production line to handle different kinds of products.

Figure 16A:
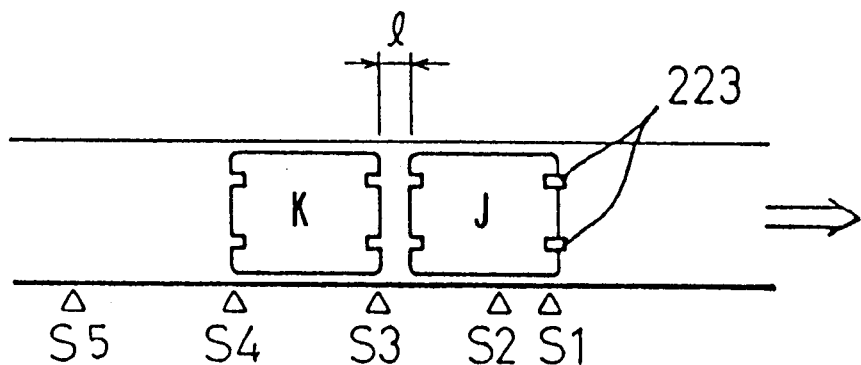
FIG. 16A is a plan view showing a pallet shock absorber according to the present invention.
Figure 16B:
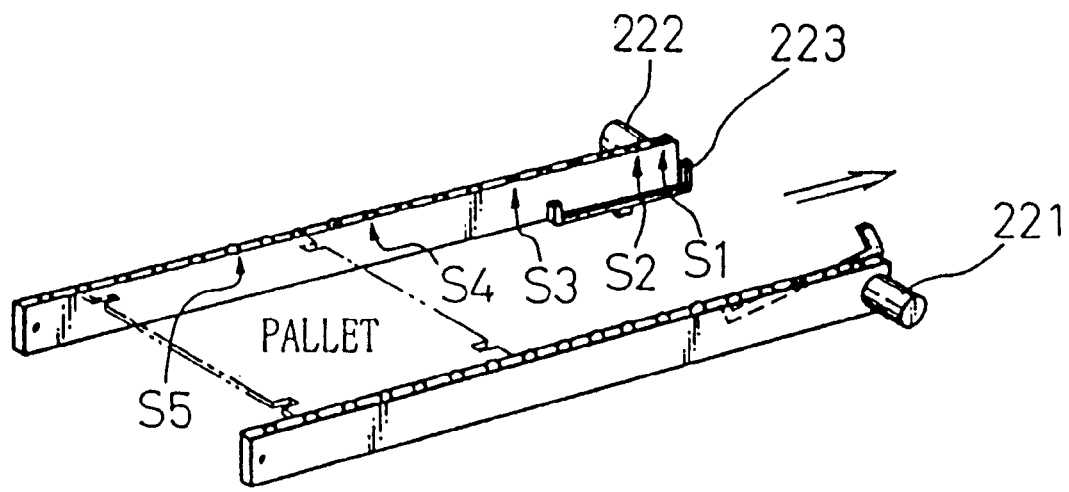
FIG. 16B is a perspective view showing the pallet shock absorber of FIG. 16A.

FIGS. 16A and 16B show a shock absorbing mechanism for pallets, in which FIG. 16A is a plan view and FIG. 16B is a perspective view. Pallets J and K are conveyed in the direction of an arrow mark along a production line. Pallet sensors S1 to S5 are arranged along the production line.

In FIG. 16A, the pallet J is stopped by a stopper 223 at the sensor S1. The pallet K nearly hits the pallet J. To avoid a shock between the pallets, a prior art provides each pallet with a shock absorber made of urethane rubber. Such a shock absorber does not completely prevent an adverse effect. According to the present invention, the sensor S3 detects the pallet K approaching the stopped pallet J, and a motor of the conveyor transporting the pallet K is stopped. The pallet K advances slightly due to inertia and then stops. A distance L between the pallets J and K is set so that no shock occurs when the pallet K hits the pallet J. The sensors S1 to S5 are arranged and adjusted according to the size and weight of each pallet.

In FIG. 16B, the conveyor has motors 221 and 222 for rotating pulleys that drive chains. Free rollers are arranged between and move with the chains. The stopper 223 is raised and lowered by an air cylinder (not shown), to stop and pass the pallet.

Figure 17:
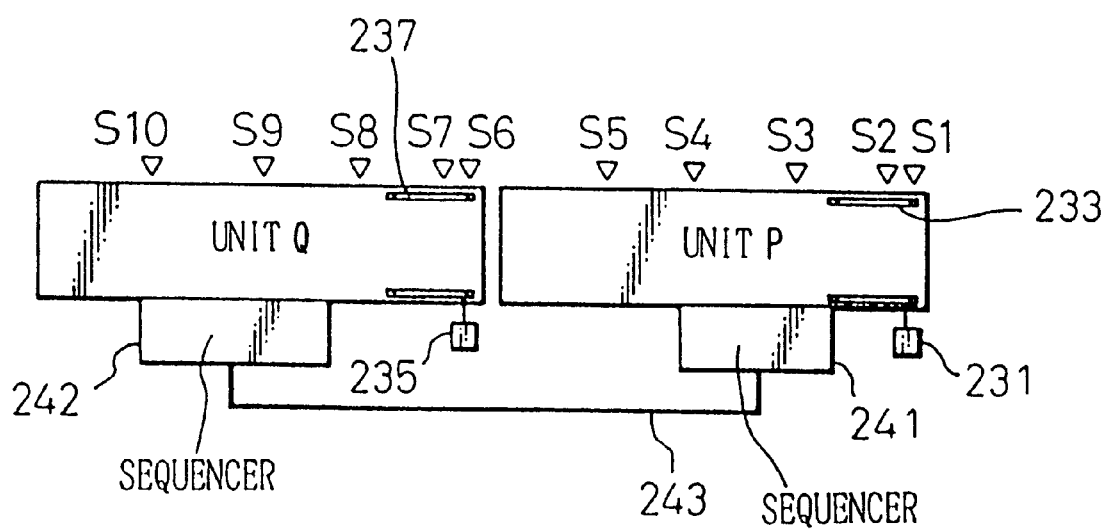
FIG. 17 shows adjacent pallet shock absorbers according to the present invention.

FIG. 17 shows two shock absorbing units P and Q for pallets. Each unit can accommodate a maximum of four pallets. The units P and Q have sequencers 241 and 242 for controlling conveyors that are driven by motors 231 and 235. The units P and Q include stoppers 233 and 237, respectively. Each of the stoppers moves up and down by an air cylinder (not shown), to stop and pass a pallet. The sequencers 241 and 242 communicate with each other through a cable 243, to transfer pallets from the unit Q to the unit P unless the unit P keeps four pallets.

When the units P and Q are empty, a pallet may be conveyed through the unit Q. The stopper 237 is lowered so as to transfer the pallet from the unit Q to the unit A. The unit A conveys the pallet to the stopper 233. If a unit in front of the unit P is full of pallets, the unit P raises the stopper 233 and stops the pallet at the position of a sensor S1. A second pallet may be conveyed through the unit Q and transferred to the unit P. The sensor S1 has informed the sequencer 241 of the presence of the first pallet at the leading end of the unit P. Accordingly, the motor 231 is stopped when a sensor S3 detects the second pallet. Then, the second pallet moves toward the first pallet due to inertia and stops. In this way, sensors S3, S4, and S5 stop the motor 231 before a pallet hits another pallet.

When the unit P is full of pallets and the unit Q is empty, a pallet may be conveyed through the unit B. When a sensor S7 detects the pallet, the sequencer 242 stops the motor 235. Accordingly, the pallet advances due to inertia and is stopped by the stopper 237 at the position of a sensor S6. In this state, a second pallet may be conveyed to the unit Q. Since the sensor S6 has informed the sequencer 242 of the presence of the first pallet, the sequencer 242 stops the motor 235 when a sensor S8 detects the second pallet. Accordingly, the second pallet advances toward the first pallet due to inertia and then stops. In this way, the sensors S8, S9, and S10 stop the motor 235 before a pallet hits another pallet.

When the units P and Q are full of pallets, the sequencer 241 of the unit A may receive a signal indicating that the last position of a unit in front of the unit P is empty. The sequencer 241 drives the motor 231 to convey the pallets in the unit P. When the sequencer 241 informs the sequencer 242 that the last position of the unit P is empty, the sequencer 242 drives the motor 235 to convey the pallets in the unit Q. As a result, the first pallet of the unit Q is transferred to the last position of the unit P, and a pallet behind the unit Q, if any, is transferred to the unit B.

In this embodiment, each shock absorbing unit contains four pallets. A plurality of shock absorbing units may be arranged in an aging system of a versatile production system. For example, the aging system may include two lines each including 21 shock absorbing units arranged in six stages. This aging system is capable of holding pallets for an extended period of time.

As explained above, a versatile production system according to the present invention is able to handle products of various heights, store pallets and products for an extended period of time, and convey the pallets without exposing same to shock.

FIG. 18 shows a basic model of a positioner according to the present invention. The positioner positions an object 301 that is two-dimensionally movable.

The positioner involves:
(1) a taper pin receiver 302 formed on the object 301;
(2) a power unit connected to a power transmission unit through a clutch, for two-dimensionally moving the object 301;

(3) a taper pin 303 fixed below the object 301, the taper pin 303 being pushed up to engage with and lift the object 301; and (4) a controller for controlling the power unit to horizontally position the object 301 at a predetermined position, and controlling the taper pin 303 to engage with the receiver 302, push up the object 301, and return to the original position.

FIG. 19 shows an application of the positioner according to the present invention. Each side of a conveyor line 311 has a rail or a rack 314. A pallet 312 carrying a product is moved on the conveyor line 311. The pallet 312 has a motor 313. The motor drives a pinion 315 through a clutch (not shown). The pinion 315 engages with the rack 314 to move the pallet 312 along the conveyor line 311. The conveyor line 311 orthogonally connects with a conveyor line 321.

When shifting from line 311 to line 321, the pallet 312 must stop at an intersection of the lines 311 and 321 with a predetermined accuracy. When the pallet 312 reaches the intersection, a sensor 318, such as a photoelectric switch, provides a signal to a programmable controller. The programmable controller stops the motor 313 and disconnects the clutch. The pallet 312 hits a stopper 317 due to inertia, moves backward as a reaction, and stops; the stopped position of which must be corrected because it is inaccurate.

For correcting the position, a taper pin 316 is fitted to the conveyor line 311. The taper pin 316 is ascended so as to engage with a taper pin receiver formed on the bottom of the pallet 312. After several seconds, the taper pin 316 descends. The engagement of the taper pin 316 with the receiver corrects the position of the pallet 312, and during this period, the motor 313 is disconnected from the pinion 315 through the clutch, so that the pallet 312 is free to move, thereby enabling the correction. The taper pin 316 ascends and descends by an air cylinder, which is activated or deactivated by a solenoid valve. The solenoid valve is energized and deenergized in response to instructions provided by the programmable controller.

FIGS. 20A and 20B show another positioner according to the present invention, in which FIG. 20A is a side view and FIG. 20B is a perspective view.

A pallet 301 has two guides 309 and four holes 310. The guides 309 fixes a product 302 at a predetermined position. The holes 310 pass taper pins 308 of a positioner. The product 302 has four taper pin receivers 307 at the bottom thereof. The taper pins 308 engage with the receivers 307, to position and fix the product 302 on the pallet 301.

The positioner with the four taper pins 308 is arranged at a predetermined position in a production line. When the product 302 on the pallet 301 reaches the predetermined position, the pallet is stopped. The taper pins 308 ascend and engage with the receivers 307 of the product 302. Accordingly, the product 302 is pushed up and fixed. Before the pallet 301 is moved to the next process, the taper pins 308 descend and lower the product 302 is lowered. The conveyor is restarted, and the pallet 301 with the product 302 is conveyed to the next process. The taper pins 308 are moved up and down by an air cylinder 305 having a solenoid valve. A controller (not shown) sequentially energizes and deenergizes the solenoid valve.

Figure 21A:
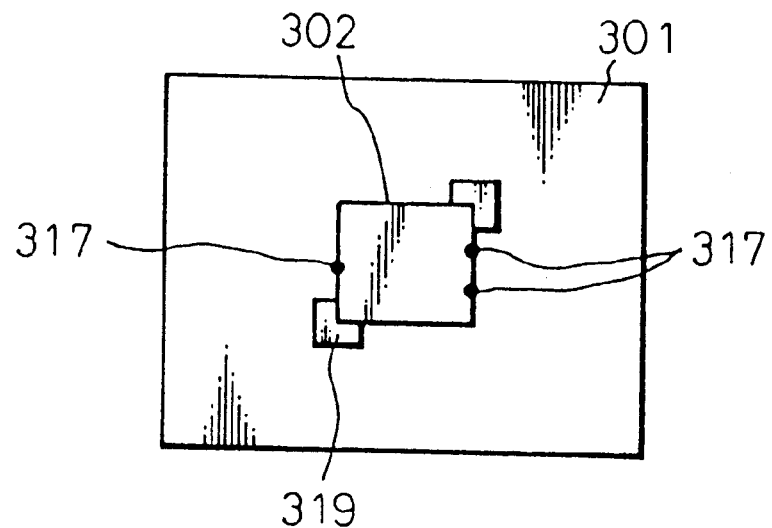
FIG. 21A is a plan view showing still another positioner according to the present invention.
Figure 21B:
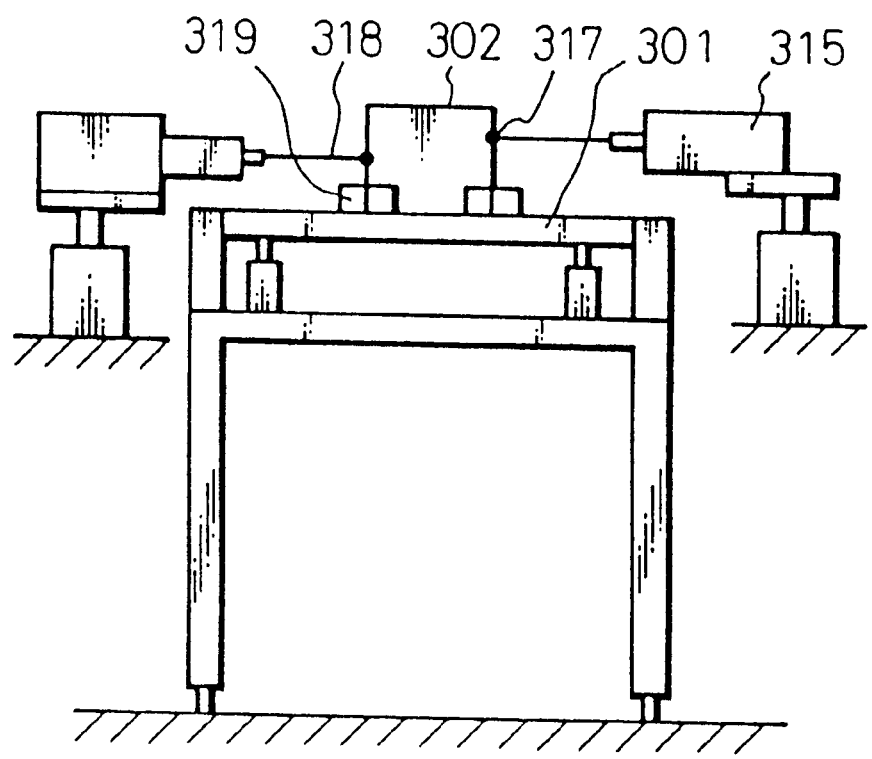
FIG. 21B is a front sectional view showing the positioner of FIG. 21A.

FIGS. 21A and 21B show still another positioner according to the present invention, in which FIG. 21A is a plan view, and FIG. 21B is a sectional front view. A pallet 301 has two guides 319 for positioning and fixing a product 302. Three taper pin receivers 317 are formed on side faces of the product 302. Three taper pins 318 move orthogonally to the advancing direction of the product 302 toward and away from the side faces of the product 302. The taper pins 318 engage with the receivers 317 and fix the product 302. Each of the taper pins 318 is moved by an air cylinder 315.

As explained above, a positioner according to the present invention is simple, inexpensive, and accurately positions a product on a pallet. The positioner of the present invention does not require the pallets to be precise. Accordingly, the pallets may be made of, for example, light and inexpensive wood material. The positioner of the present invention requires a simple jig for fitting a product on a pallet in an automatic assembling line.

FIG. 22 shows pallets to be fed to the start of a production line. The pallets 401 are loaded on a cart 411 beside a pallet feeder 402. The pallet feeder 402 feeds the pallets one by one to the start 403 of the production line. The pallet 401 is then conveyed by a conveyor 405 to a first assembling position. The pallet feeder 402 has a control box 412 having switches for starting and resetting the pallet feeder 402.

Figure 23A:
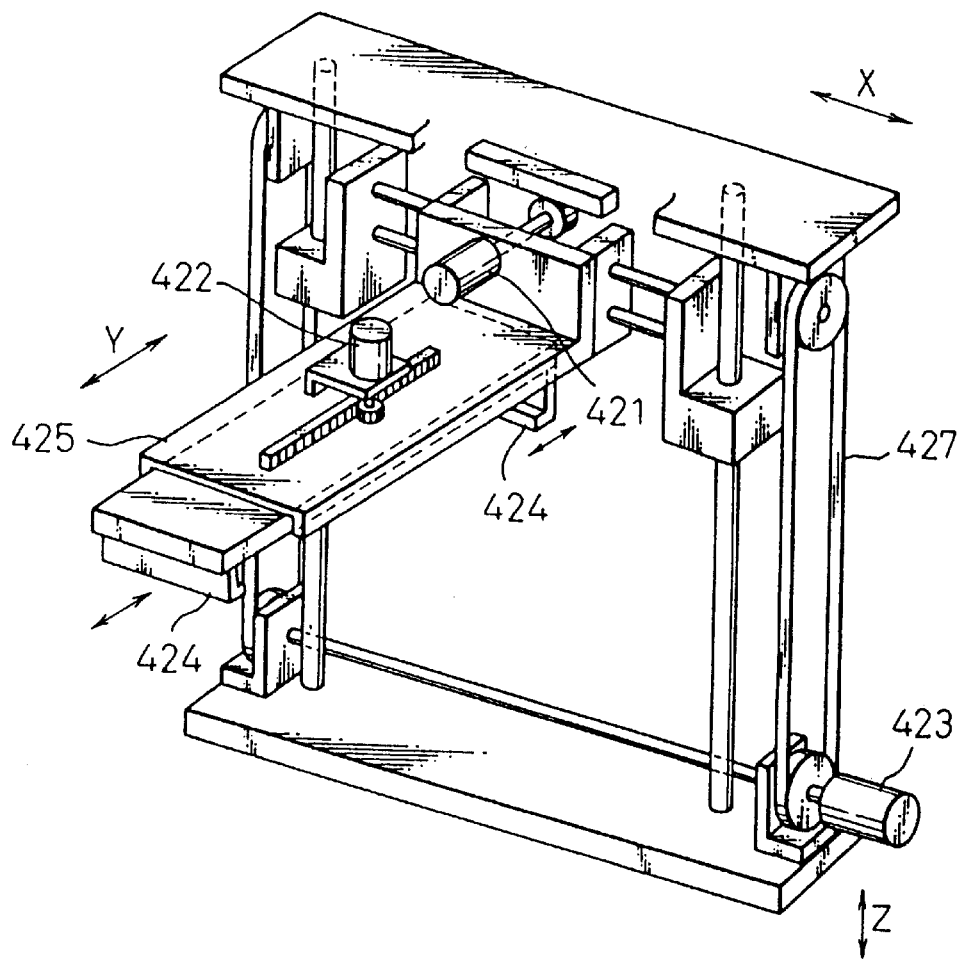
FIG. 23A is a perspective view showing a pallet feeder according to the present invention.
Figure 23B:
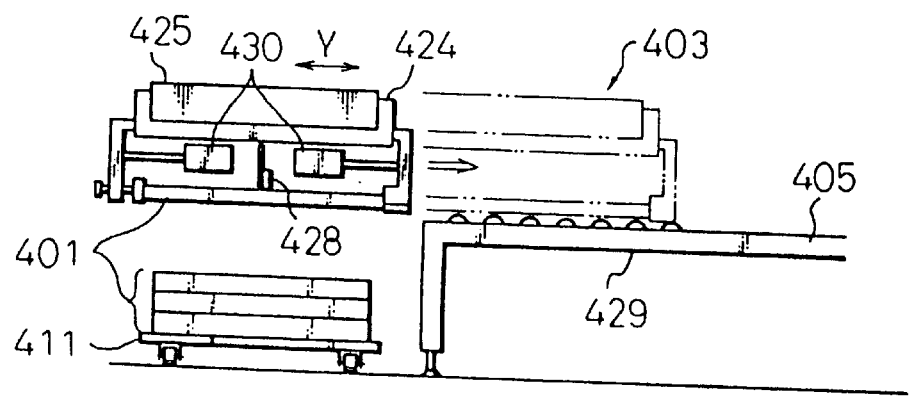
FIG. 23B is a side view showing the pallet feeder of FIG. 23A.

FIG. 23A is a perspective view of the pallet feeder, and 23B is a side view of the same. The pallet feeder has an X-axis motor 421, a pallet holder 424, and a pallet base 425 integral with the pallet holder 424. The pallet holder 424 holds the pallet 401, and the motor 421 moves the pallet base 425 in an X-axis direction orthogonal to the pallet conveying direction of the production line. A Y-axis motor 422 moves the pallet base 425 in an Y-axis direction along a slide rail parallel to the pallet conveying direction. A Z-axis motor 423 moves the pallet base 425 up and down in an Z-axis direction.

A microswitch 428 detects when the pallet base 425 makes contact with the top pallet 401 on the cart 411. A sensor 429 detects when the pallet 401 is placed on the conveyor 405 or when the pallet 401 is present on the conveyor 405 at the start 403 of the production line.

The pallet holder 424 is driven by air cylinders 430 in the direction Y so as to hold the pallet 401.

Figure 24A:
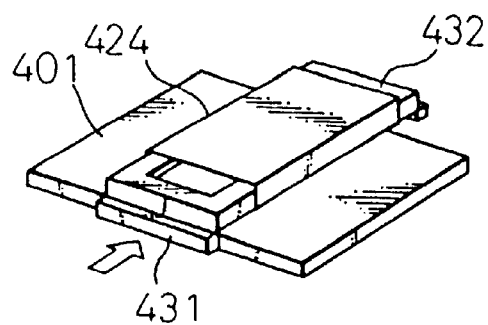
FIG. 24A shows a longitudinal alignment operation of the pallet feeder.
Figure 24B:
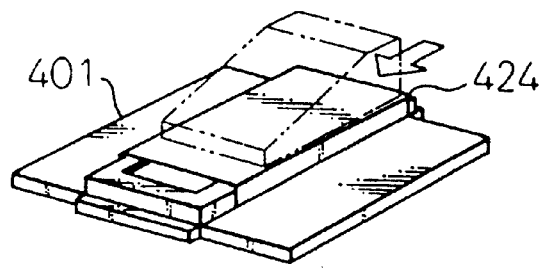
FIG. 24B shows a pallet holding operation of the pallet feeder.
Figure 24C:
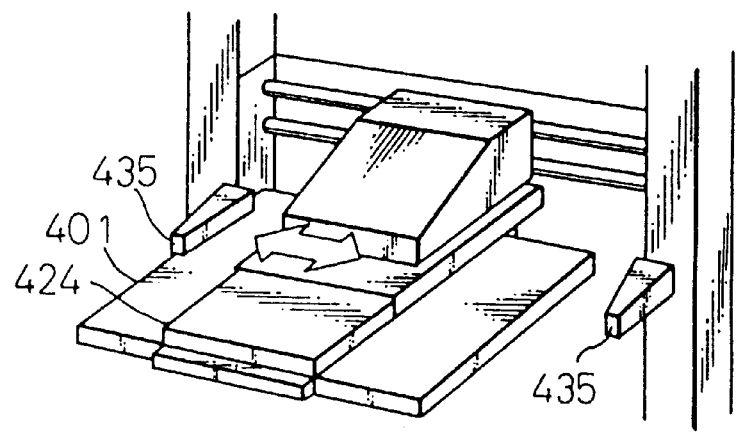
FIG. 24C shows a lateral alignment operation of the pallet feeder.
Figure 24D:
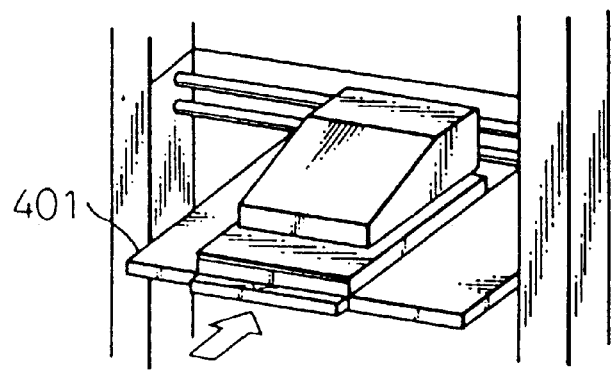
FIG. 24D shows a feeding operation of the pallet feeder.

FIGS. 24A to 24D show operations of the pallet feeder 402, in which FIG. 24A shows a longitudinal aligning operation, FIG. 24B shows a pallet holding operation, FIG. 24C shows a lateral aligning operation, and FIG. 24D shows a pallet feeding operation.

In FIG. 24A, a rear chuck 431 of the pallet feeder pushes an end face of the pallet 401 so as to longitudinally align the pallet 401. In FIG. 24B, a front chuck 432 is closed to hold the pallet 401. In FIG. 24C, the pallet 401 is lifted from the cart up to the level of the conveyor 405. The pallet 401 is laterally aligned using side sensors 435. In FIG. 4D, the pallet 401 is placed on the conveyor 405 at the start of the production line if it is confirmed that no pallet is present at the start of the conveyor 405.

Figure 25:
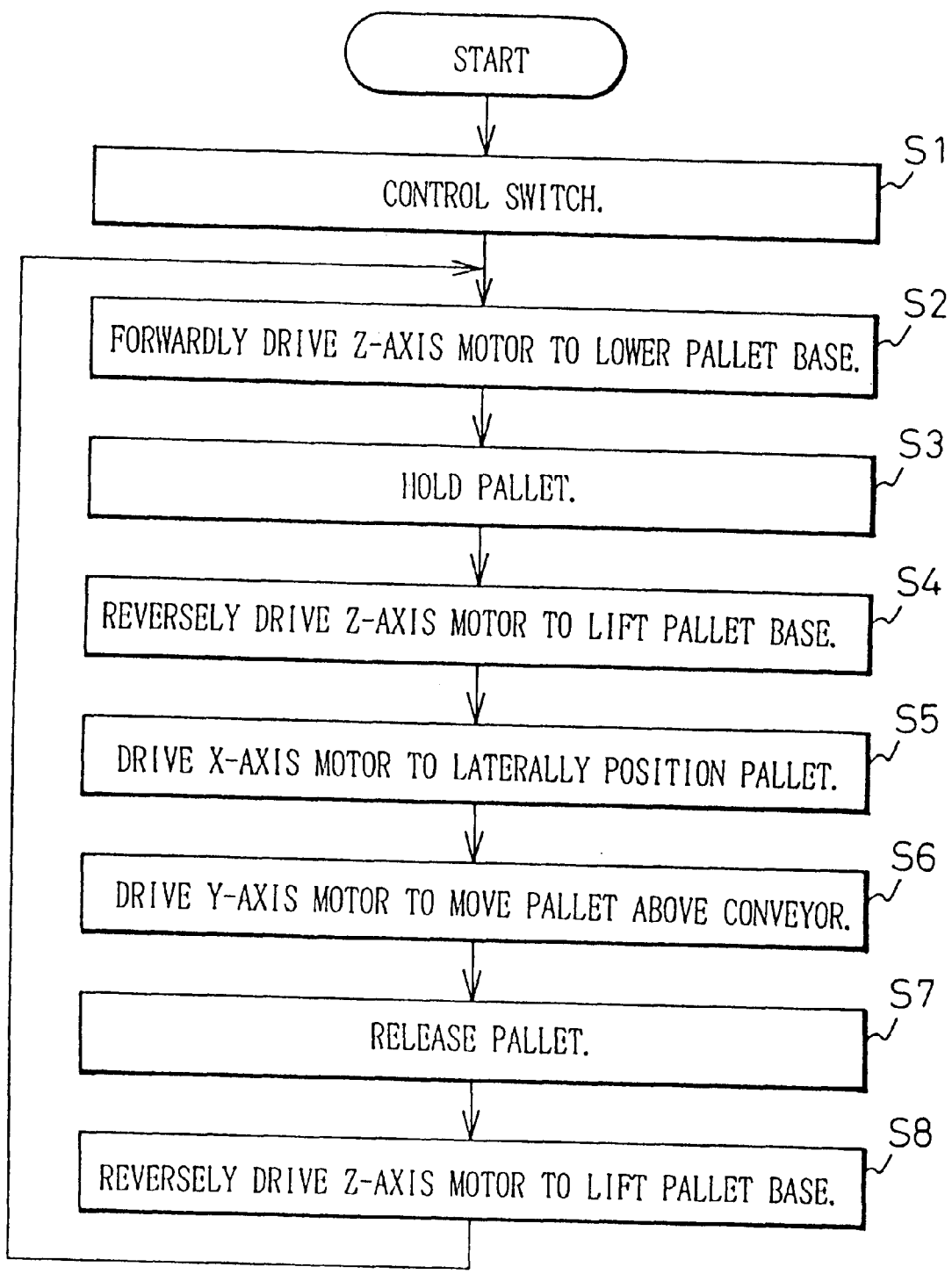
FIG. 25 is a flowchart showing the operation of the pallet feeder.

FIG. 25 is a flowchart showing the operation of the pallet feeder according to the present invention.

At first, a cart 411 with pallets is placed beside the pallet feeder.

In step S1, an operator activates the control box 412 of FIG. 22. Once activated, a storage unit of a programmable controller (not shown) stores information indicating that the pallet feeder is in operation, until a reset operation is effected.

In step S2, the Z-axis motor 423 is driven in a forward direction so as to descend the pallet holder 424 and pallet base 425. When the microswitch 428 detects that the pallet base 425 makes contact with the top pallet on the cart 411, the motor 423 is stopped.

In step S3, a solenoid valve of the air cylinder 430 of the pallet holder 424 is activated so as to hold the top pallet.

In step S4, the Z-axis motor 423 is driven in a reverse direction and the pallet holder 424 and pallet base 425 ascend with the pallet. When a microswitch (not shown) detects that the pallet is lifted to the level of the conveyor 405, the motor 423 is stopped.

In step S5, the X-axis motor 421 is driven so as to laterally align the pallet. When the two sensors 435 of FIG. 24C do not detect the pallet, the motor 421 is stopped.

In step S6, the sensor 429 detects that there is no pallet at the start of the conveyor 405, the Y-axis motor 422 is started and the pallet holder 424 with the pallet moves toward the conveyor.

In step S7, the sensor 429, which senses that there is no pallet on the conveyor 405, deenergizes the solenoid of the air cylinder 430 of the pallet holder 424 and the pallet is dropped onto the conveyor.

In step S8, when the sensor 429 detects the dropped pallet on the conveyor 405, the Z-axis motor 423 is driven in the reverse direction and the pallet base 425 ascends which is stopped at a predetermined position. The flow then returns to step S2.

If the operation is not reset, the steps following step S2 are repeated.

In this way, a pallet feeder according to the present invention automatically feeds pallets one by one to the start of a production line, thereby reducing the work load of the workers and realizing automation.

Figure 26:
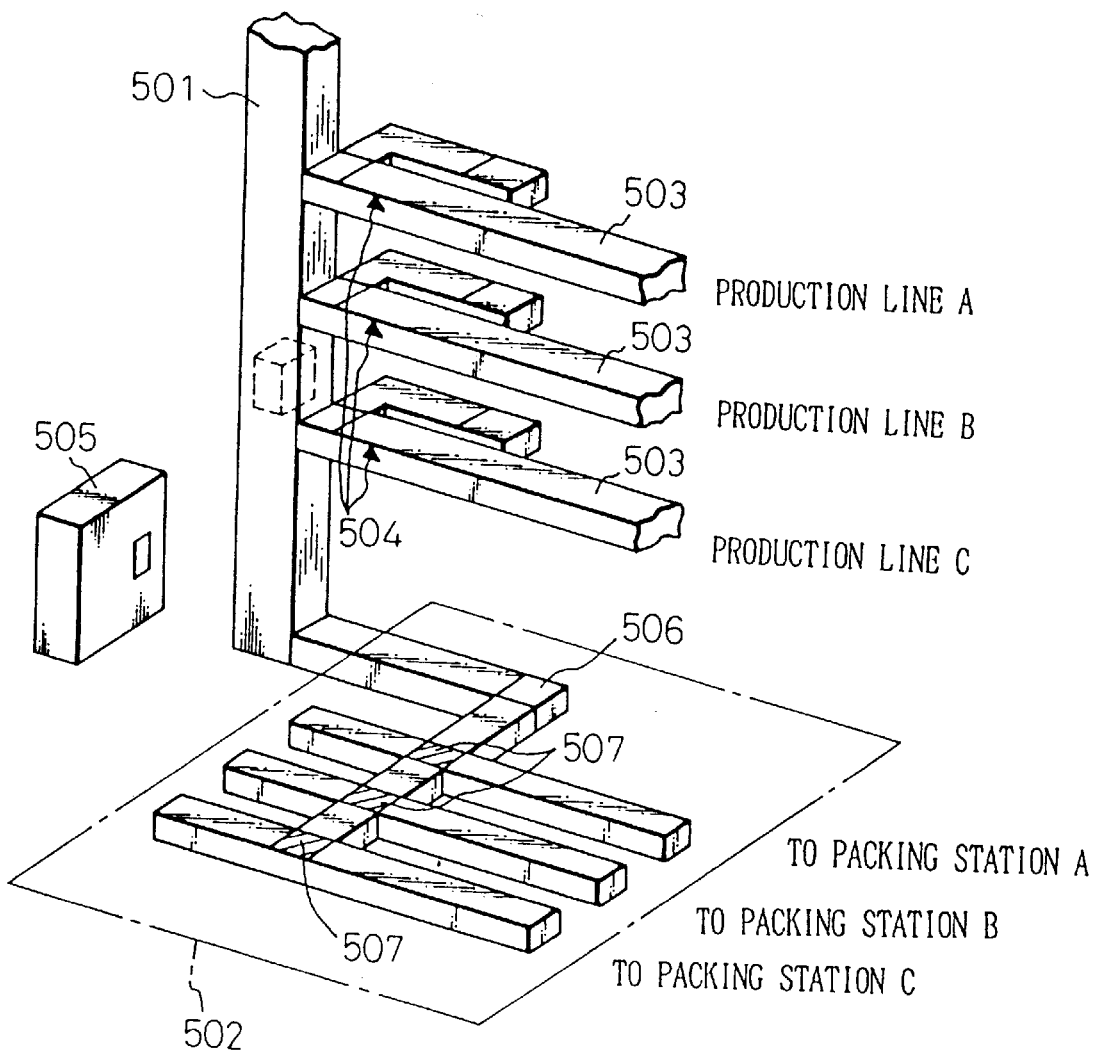
FIG. 26 shows a basic model of a collective packing system according to the present invention.

FIG. 26 shows a basic model of a collective packing system according to the present invention. Products set on pallets are collected from different production lines to a collective packing terminal and are packed. Emptied pallets are returned from the packing terminal to the respective production lines.

The collective packing system involves:

(1) a main conveyor 501 for conveying pallets with products from the production lines to the packing terminal, and returning the pallets separated by the return destination selector 502 to the respective production lines;

(2) a return destination selector 502 for identifying pallets sent from the production lines and separating them from one another so that they are returned to the respective production lines;

(3) a conveyor 503 disposed along each of the production lines that conveys pallets with products along the production line up to the main conveyor 501;

(4) a pallet detector 504 disposed at the leading end of each of the conveyors 503 so as to detect whether or not a pallet is present at the leading end; and (5) a controller 505 having a programmable controller, a motor controller, etc., to control the collective packing system as a whole.

The collective packing system may include:

(6) a pallet identification unit 506 having sensors for sensing the product loading area, the thickness, and the shape of a pallet, a reader for reading a bar code attached to a pallet, and a programmable controller; and (7) a direction switcher 507 for changing the conveying direction of pallets and having a stopper moving in one direction, a roller conveyor for conveying the pallets, a vertically movable belt conveyor for conveying the pallets, sensors for detecting whether or not the pallets are present, a motor for driving the roller conveyor, a motor for driving the belt conveyor, and a programmable controller.

The return destination selector 502 may include the pallet identification units 506 and direction switchers 507.

Figure 27A:
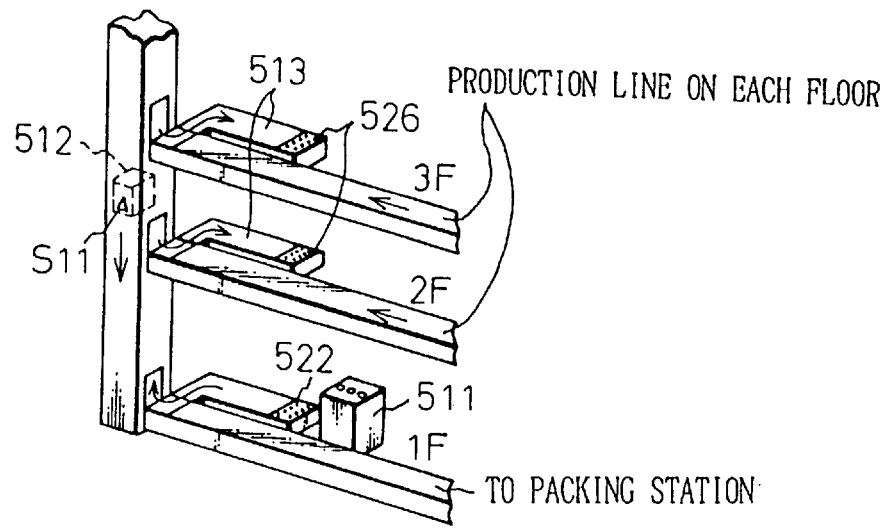
FIG. 27A is a general view showing a collective packing system according to the present invention.
Figure 27B:
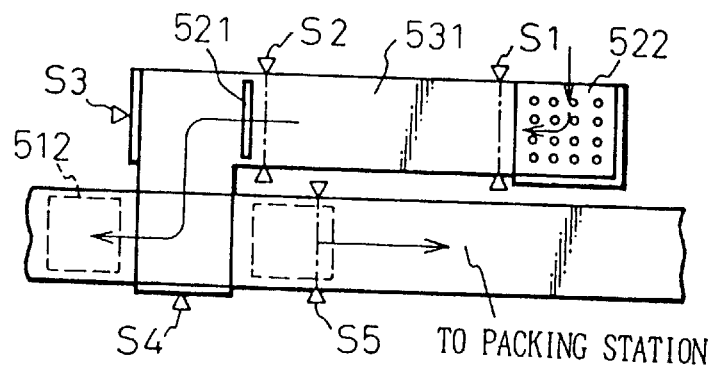
FIG. 27B is a plan view showing the first floor of the collective packing system.
Figure 27C:
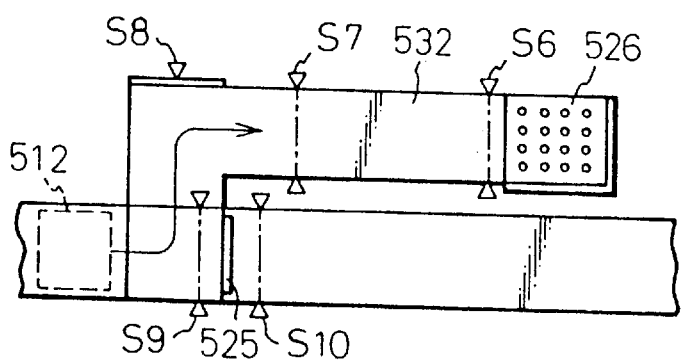
FIG. 27C is a plan view showing a delivery position between the collective packing system and a production line on the second and third floors.

FIGS. 27A to 27C show an embodiment of the collective packing system according to the present invention. The collective packing system is installed on the first floor 1F, and production lines are installed on the second and third floors 2F and 3F, respectively. These production lines produce different kinds of products. In each production line, a product is set on a pallet and conveyed by a conveyor 513 to a vertical mover such as an elevator 512. The pallet and product are transported by the elevator 512 to the first floor.

On the first floor, the product is sent to a packing terminal, and the pallet is sent to a pallet loading position 522. A button on a switch box 511 is pushed to specify the floor to which the pallet is returned. The pallet is then automatically returned to a loading position 526 of the specified floor.

A sensor S11 determines whether or not a pallet is present in the elevator 512.

Figure 27D:
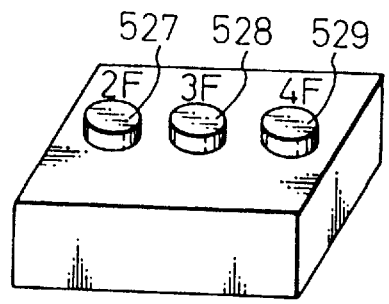
FIG. 27D shows a switch box for specifying a return destination.

FIG. 27B is a plan view showing the collective packing terminal on the first floor; FIG. 27C is a plan view showing a delivery point of the production line to and from the elevator 512 on each of the second and third floors, and FIG. 27D is a perspective view showing the switch box 511. Sensors S1 to S10 detect whether or not a pallet is present at respective positions. Conveyors 531 and 532 are used to return pallets. The switch box 511 has buttons 527, 528, and 529 for specifying any one of the second, third, and fourth (not used in this embodiment) floors to which pallets are returned.

Figure 28A:
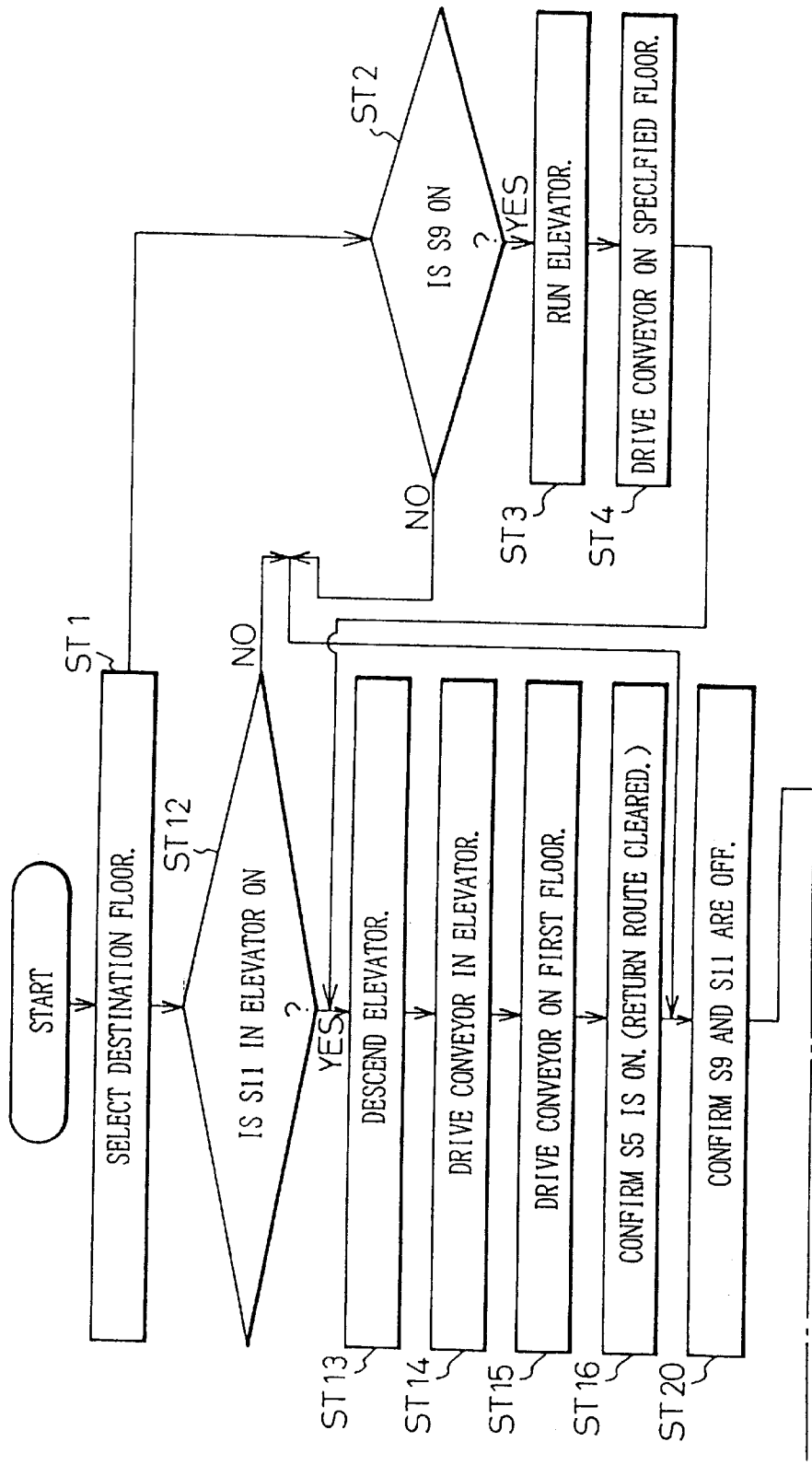
FIG. 28A is a half part of a flowchart showing the operation of the collective packing system.

FIG. 28A and FIG. 28B are each half part of a flowchart showing the operation of the collective packing system. The operation involves a product conveying mode for conveying products set on pallets from the second and third floors to the first floor, and a pallet returning mode for returning the pallets to the second and third floors. Since the product conveying mode is well known, it will not be explained.

The pallet returning mode will be explained with reference to FIGS. 27 and 28. This mode is controlled by a programmable controller. The programmable controller receives signals from the sensors S1 to S10 and provides control signals to motors.

In step ST1, an operator pushes, for example, the button 527 of the switch box 511, to return pallets to the second floor. The programmable controller senses that the button 527 has been pushed.

Step ST2 checks to determine whether or not the sensor S9 on the specified second floor is ON. If it is ON, the flow goes to step ST3, and if it is OFF, the flow goes to step ST20.

Step ST3 drives a servo motor of the elevator 512, and stops the elevator at the specified floor where the sensor S9 is ON.

Step ST4 drives the conveyor motor on the specified floor, and a pallet carrying a product is placed into the elevator 512.

Step ST12 determines whether or not the elevator 512 contains a pallet according to a signal provided by the sensor S11. If a pallet is in the elevator, the flow goes to step ST13, and if not, to step ST20.

Step ST13 descends the elevator 512.

Step ST14 confirms that the elevator 512 has reached the first floor according to a signal provided by a limit switch, and drives a conveyor in the elevator to deliver the pallet with the product outside.

Step ST15 drives the conveyor on the first floor, to convey the pallet and product to the packing terminal.

Step ST16 checks to determine whether or not the pallet and product have reached the packing terminal according to a signal provided by the sensor S5.

Step ST20 confirms that signals of the sensors S9 and S11 are each OFF.

Step ST21 confirms that a signal of the sensor S2 is ON.

Step ST22 energizes a solenoid valve of a cylinder of a stopper 521 and the stopper 521 is lowered.

Step ST23 descends the elevator 512.

Step ST24 drives the return conveyor 531, and checks to determine whether signals of the sensors S3 and S4 are each ON.

Step ST25 drives the conveyor motor in the elevator 512, feeds the pallet into the elevator, confirms that the sensor S11 provides an ON signal, and the elevator 512 ascends to the floor specified in step ST1.

Step ST26 stops the elevator 512 at the specified floor, drives the conveyor motor in the elevator, delivers the pallet outside the elevator, and confirms that the sensor S11 provides an OFF signal.

Step ST27 drives the conveyor motor on the specified floor, and checks a signal provided by the sensor S9.

Step ST28 drives the return conveyor 532 of the specified floor, and confirms that the sensors S7 and S6 each provide an ON signal.

Step ST29 descends the elevator 512 to the first floor, and goes to step ST21.

Figure 29:
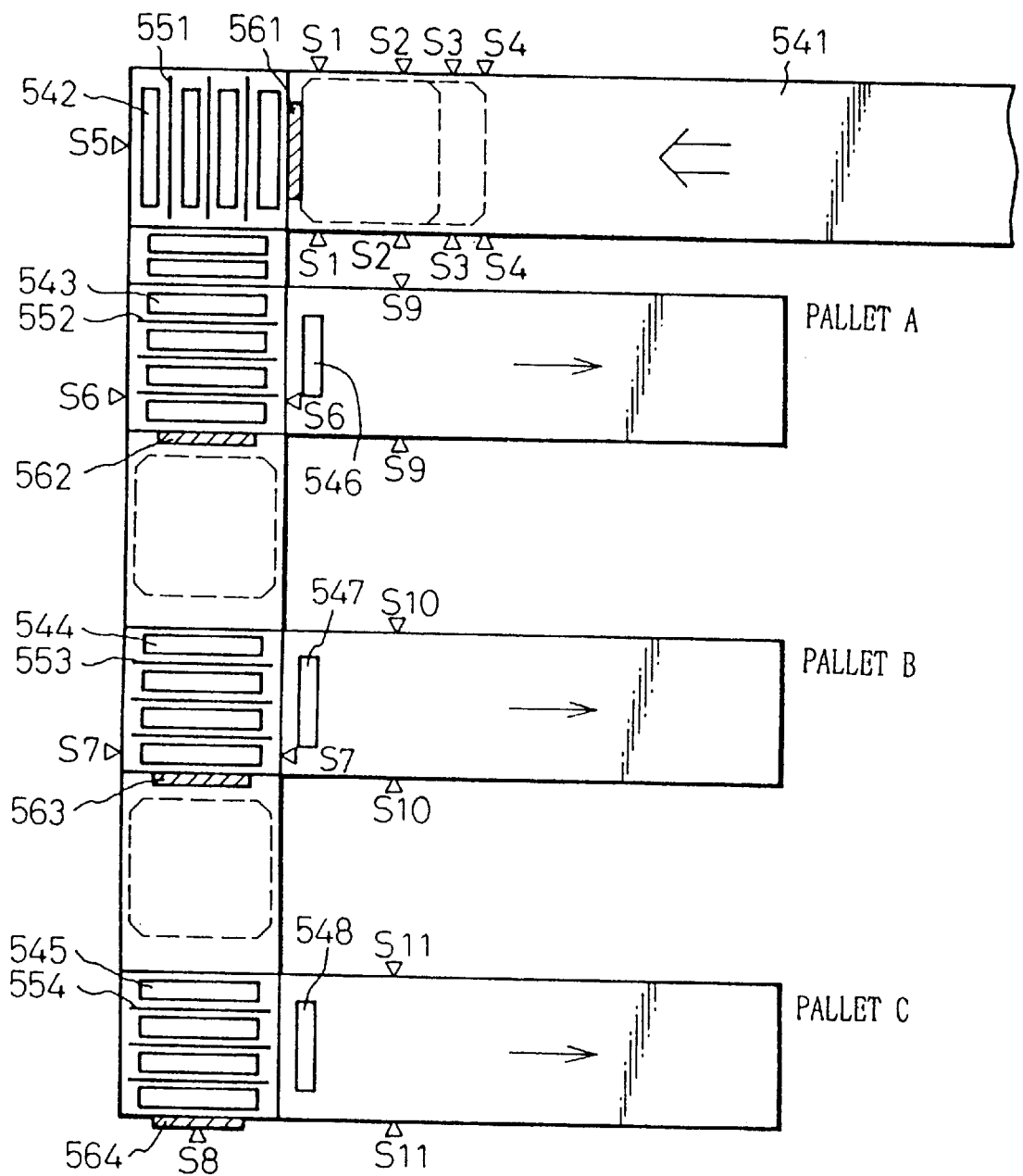
FIG. 29 shows a return destination selector according to the present invention.

FIG. 29 shows a return destination selector according to the present invention. In FIGS. 27A to 27D, pallets are separated by workers. The embodiment of FIG. 29 automatically separates pallets depending on type. This embodiment includes roller conveyors 541 to 548, belt conveyors 551 to 554, pallet sensors S1 to S11, stoppers 561 to 563 each having a vertically movable air cylinder, and a fixed stopper 564.

The sensors S1 to S4 identify the type of each pallet. Namely, the sensor S3 detects the loading area of a pallet, and the sensor S4 detects the thickness of the pallet. For example, pallets A and C have the same loading area and different thicknesses, and pallets B and C have different areas and the same thickness. In this case, the pallet A turns ON all the sensors S1 to S4. The pallet B turns ON the sensors S1 and S2, and turns OFF the sensors S3 and S4. The pallet C turns ON the sensors S1 to S3, and turns OFF the sensor S4. In this way, each of the pallets A to C is identifiable.

A pallet carrying a product is conveyed by the roller conveyor 541 along a production line, and is stopped by the stopper 561. The sensors S1 to S4 provide signals, according to which the pallet is determined to be one of the pallets A to C, and the determination result is stored.

The stopper 561 is lowered, the roller conveyor 541 is stopped, and the roller conveyor 542 is started. When the sensor S5 provides an ON signal, the roller conveyor 542 is stopped, and the belt conveyor 551 is raised and driven. The roller conveyor 543 is started and the pallet is conveyed up to the stopper 562. The sensor S6 provides a signal to confirm the presence of the pallet.

If the pallet has been determined to be A at the first stopper 561, the belt conveyor 551 is stopped, the roller conveyor 543 is stopped, the belt conveyor 552 is raised and driven, and the roller conveyor 546 is driven. After the sensor S9 is turned ON and the sensor S6 is turned OFF, the belt conveyor 552 stops and descends.

If the pallet has been determined to be B at the first stopper 561, the belt conveyor 551 is stopped, the roller conveyor 543 is continuously driven, the belt conveyor 552 continues to descend, the stopper 562 is lowered, and the roller conveyor 544 is driven. When the sensor S7 confirms that the pallet has reached the stopper 563, the roller conveyor 543 is stopped, the roller conveyor 544 is stopped, the belt conveyor 553 is raised and driven, and the roller conveyor 547 is driven. After the sensor S10 is turned ON and the sensor S7 is turned OFF, the belt conveyor 553 stops and descends.

If the pallet has been determined to be C at the first stopper 561, the belt conveyor 551 is stopped, the roller conveyor 543 is continuously driven, the stopper 562 is lowered, the belt conveyor 552 continues to descend, and the roller conveyor 544 is driven. When the sensor S7 confirms that the pallet has reached the stopper 563, the belt conveyor 553 continues to descend, the stopper 563 is lowered, and the roller conveyor 545 is driven. When the sensor S8 confirms that the pallet has reached the stopper 564, the belt conveyor 554 is raised and driven, and the roller conveyor 548 is driven. After the sensor S11 is turned ON and the sensor S8 is turned OFF, the belt conveyor 554 stops and descends.

As explained above, a collective packing system according to the present invention automatically identifies the type of each pallet transported from different production lines to a collective packing terminal. When returning the pallets to the respective production lines, the system requires no separate transportation lines in addition to the transportation lines used to convey the pallets with products from the production lines to the packing terminal. It is not necessary, therefore, for workers to load and unload the pallets to and from carts, thereby reducing labor. The system correctly discriminates between different kinds of pallets thereby eliminating loss of work time.

We claim:

1. A pallet routing system which transfers pallets between a plurality of production lines and a main site, each pallet corresponding to a respective production line, the pallet routing system comprising:

a main conveyor which conveys pallets from the respectively corresponding production lines to the main site and returns pallets from the main site to the respectively corresponding production lines;

return destination selection means for identifying each pallet conveyed by the main conveyor, determining which respective production line corresponds to the identified pallet and producing a corresponding production line determination output;

a plurality of production line conveyors, each production line conveyor individually corresponding to a respective production line and conveying pallets from the respective production line to the main conveyor, each production line conveyor having a corresponding transfer point from which pallets are transferred to the main conveyor and to which the main conveyer transfers pallets;

pallet detection means for detecting the presence of a pallet at the transfer points and producing a corresponding detection output; and control means, responsive to the production line determination output and the detection output, for controlling the main conveyor to return pallets from the main site to the respectively corresponding production lines, a respective pallet being returned to the respectively corresponding production line after the pallet detection means detects that there is no pallet at the transfer point of the respectively corresponding production line, wherein each production line intersects the main conveyor at a corresponding intersection point, the pallet routing system further comprising a switching means for switching the respective pallets from the main conveyer to the corresponding production line, the switching means comprising a pallet transfer mechanism positioned at each intersection point and corresponding to the respective production line associated with the respective intersection point, each pallet transfer mechanism comprising a stopper that ascends to stop a pallet conveyed along the main conveyor when the pallet corresponds to the respective production line, and descends to allow the pallet to pass the stopper when the pallet does not correspond to the respective production line, a transfer conveyor which, when activated, removes a pallet thereon from the main conveyor and conveys the pallet to the corresponding production line, and control means for controlling the stopper and the transfer conveyor so that the stopper ascends to stop a pallet identified by the return destination selection means to be a corresponding pallet of the respective production line and descends to allow pallets to pass which are not corresponding pallets of the respective production line, and activates the transfer conveyer when a pallet corresponding to the respective production line is stopped by the stopper.

2. A pallet routing system as in claim 1, wherein the main conveyor comprises a roller conveyor which conveys pallets along the main conveyor and each transfer conveyor comprises a belt conveyor in a positional relationship with the roller conveyor so that, when activated, the belt conveyor ascends to lift a pallet from the roller conveyor and transfer the lifted pallet to the corresponding production line.

3. A pallet routing system which transfers pallets between a plurality of production lines and a main site, each pallet corresponding to a respective production line, the pallet routing system comprising:

a main conveyor which conveys pallets from the respectively corresponding production lines to the main site and returns pallets from the main site to the respectively corresponding production lines;

return destination selection means for identifying each pallet conveyed by the main conveyor, determining which respective production line corresponds to the identified pallet and producing a corresponding production line determination output;

a plurality of production line conveyors, each production line conveyor individually corresponding to a respective production line and conveying pallets from the respective production line to the main conveyor, each production line conveyor having a corresponding transfer point from which pallets are transferred to the main conveyor and to which the main conveyor transfers pallets;

pallet detection means for detecting the presence of a pallet at the transfer points and producing a corresponding detection output; and control means, responsive to the production line determination output and the detection output, for controlling the main conveyor to return pallets from the main site to the respectively corresponding Production lines, a respective pallet being returned to the respectively corresponding production line after the pallet detection means detects that there is no pallet at the transfer point of the respectively corresponding production line, wherein each pallet has a corresponding identifying characteristic, the return destination selection means comprises a pallet identification means that identifies the corresponding characteristic of a respective pallet and, based on the identified characteristic, identifies the production line that corresponds to the pallet, each production line intersects the main conveyor at a corresponding intersection point, the pallet routing system further comprising a switching means for switching the respective pallets from the main conveyer to the corresponding production line, the switching means comprising a pallet transfer mechanism positioned at each intersection point and corresponding to the respective production line associated with the respective intersection point, each pallet transfer mechanism comprising a stopper that ascends to stop a pallet conveyed along the main conveyor when the pallet corresponds to the respective production line, and descends to allow the pallet to pass the stopper when the pallet does not correspond to the respective production line, a transfer conveyor which, when activated, removes a pallet thereon from the main conveyor and conveys the pallet to the corresponding production line, and control means for controlling the stopper and the transfer conveyor so that the stopper ascends to stop a pallet identified by the return destination selection means to be a corresponding pallet of the production line and descends to allow pallets to pass which are not corresponding pallets of the respective production line, and activates the transfer conveyer when a pallet corresponding to the respective production line is stopped by the stopper.

4. A pallet routing system as in claim 3, wherein the main conveyor comprises a roller conveyor which conveys pallets along the main conveyor and each transfer conveyor comprises a belt conveyor in a positional relationship with the roller conveyor so that, when activated, the belt conveyor ascends to lift a pallet from the roller conveyor and transfer the lifted pallet to the corresponding production line.

5. A pallet routing system which transfers pallets between a plurality of production lines and a main site, each Pallet corresponding to a respective production line, the pallet routine system comprising:

a main conveyor which conveys pallets from the respectively corresponding production lines to the main site and returns pallets from the main site to the respectively corresponding production lines;

return destination selection means for identifying each pallet conveyed by the main conveyor, determining which respective production line corresponds to the identified pallet and producing a corresponding production line determination output;

a plurality of production line conveyors, each production line conveyor individually corresponding to a respective production line and conveying pallets from the respective production line to the main conveyor, each production line conveyor having a corresponding transfer point from which pallets are transferred to the main conveyor and to which the main conveyer transfers pallets;

pallet detection means for detecting the presence of a pallet at the transfer points and producing a corresponding detection output; and control means, responsive to the production line determination output and the detection output, for controlling the main conveyor to return pallets from the main site to the respectively corresponding production lines, a respective pallet being returned to the respectively corresponding production line after the pallet detection means detects that there is no pallet at the transfer point of the respectively corresponding production line, wherein each production line intersects the main conveyor at a corresponding intersection point and the main conveyor comprises a roller conveyor at the intersection point having a low level of friction so that the roller conveyor conveys pallets based on the inertia of the pallets, the pallet routing system further comprising a switching means for switching the respective pallets from the main conveyer to the corresponding production line, the switching means comprising a pallet transfer mechanism positioned at each intersection point and corresponding to the respective production line associated with the respective intersection point, each pallet transfer mechanism comprising a stopper that ascends to stop a pallet conveyed along the roller conveyor of the main conveyor when the pallet corresponds to the respective production line, and descends to allow the pallet to pass the stopper when the pallet does not correspond to the respective production line, a transfer conveyor which, when activated, removes a pallet thereon from the main conveyor and conveys the pallet to the corresponding production line, the transfer conveyor comprising a belt conveyor in a positional relationship with the roller conveyor of the main conveyor so that, when activated, the belt conveyor ascends to lift a pallet from the roller conveyor and transfer the lifted pallet to the corresponding production line, a sensor which detects the presence of a pallet on the roller conveyor and stopped by the stopper, and control means for controlling the stopper and the transfer conveyor so that the stopper ascends to stop a pallet identified by the return destination selection means to be a corresponding pallet of the respective production line and descends to allow pallets to pass which are not corresponding pallets of the respective production line, and activates the transfer conveyor when a pallet corresponding to the respective production line is stopped by the stopper and detected by the sensor.

6. A pallet routing system which transfers pallets between a plurality of production lines and a main site, each pallet corresponding to a respective production line, the pallet routing system comprising:

a main conveyor which conveys pallets from the respectively corresponding production lines to the main site and returns pallets from the main site to the respectively corresponding production lines;

return destination selection means for identifying each pallet conveyed by the main conveyor, determining which respective production line corresponds to the identified pallet and producing a corresponding production line determination output;

a plurality of production line conveyors, each production line conveyor individually corresponding to a respective production line and conveying pallets from the respective production line to the main conveyor, each production line conveyor having a corresponding transfer point from which pallets are transferred to the main conveyor and to which the main conveyer transfers pallets;

pallet detection means for detecting the presence of a pallet at the transfer points and producing a corresponding detection output; and control means, responsive to the production line determination output and the detection output, for controlling the main conveyor to return pallets from the main site to the respectively corresponding production lines, a respective pallet being returned to the respectively corresponding production line after the pallet detection means detects that there is no pallet at the transfer point of the respectively corresponding production line, wherein each pallet has a corresponding identifying characteristic, the return destination selection means comprises a pallet identification means that identifies the corresponding characteristic of a respective pallet and, based on the identified characteristic, identifies the production line that corresponds to the pallet, each production line intersects the main conveyor at a corresponding intersection point and the main conveyor comprises a roller conveyor at the intersection point having a low level of friction so that the roller conveyor conveys pallets based on the inertia of the pallets, the pallet routing system further comprising a switching means for switching the respective pallets from the main conveyer to the corresponding production line, the switching means comprising a pallet transfer mechanism positioned at each intersection point and corresponding to the respective production line associated with the respective intersection point, each pallet transfer mechanism comprising a stopper that ascends to stop a pallet conveyed along the roller conveyor of the main conveyor when the pallet corresponds to the respective production line, and descends to allow the pallet to pass the stopper when the pallet does not correspond to the respective production line, a transfer conveyor which, when activated, removes a pallet thereon from the main conveyor and conveys the pallet to the corresponding production line, the transfer conveyor comprising a belt conveyor in a positional relationship with the roller conveyor of the main conveyor so that, when activated, the belt conveyor ascends to lift a pallet from the roller conveyor and transfer the lifted pallet to the corresponding production line, a sensor which detects the presence of a pallet on the roller conveyor and stopped by the stopper, and control means for controlling the stopper and the transfer conveyor so that the stopper ascends to stop a pallet identified by the return destination selection means to be a corresponding pallet of the respective production line and descends to allow pallets to pass which are not corresponding pallets of the respective production line, and activates the transfer conveyer when a pallet corresponding to the respective production line is stopped by the stopper and detected by the sensor.

* * * * *

UNITED STATES PATENT AND TRADEMARK OFFICE
CERTIFICATE OF CORRECTION

PATENT NO.: 6,105,242
DATED : August 22, 2000
INVENTOR(S): Kazumi MIYASAKA, et al.

It is certified that an error appears in the above-identified patent and that said Letters Patent is hereby corrected as shown below:

[73] Assignee: [Fujitsu Limited, Kawasaki, Japan] PFU Limited, Ishikawa, Japan*

Signed and Sealed this

Twenty-second Day of May, 2001

Attest:

NICHOLAS P. GODICI

Attesting Officer     Acting Director of the United States Patent and Trademark Office